(12) United States Patent
Hori et al.

(10) Patent No.: US 6,776,033 B2
(45) Date of Patent: Aug. 17, 2004

(54) APPARATUS FOR IDENTIFICATION OF CYLINDERS IN AN INTERNAL COMBUSTION ENGINE

(75) Inventors: Yasuyoshi Hori, Tokyo (JP); Shiro Yonezawa, Tokyo (JP); Akira Furuta, Tokyo (JP); Hideki Hagari, Tokyo (JP); Tatsuhiko Takahashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 52 days.

(21) Appl. No.: 10/307,939

(22) Filed: Dec. 3, 2002

(65) Prior Publication Data

US 2004/0000190 A1 Jan. 1, 2004

(30) Foreign Application Priority Data

Jun. 26, 2002 (JP) .................................... 2002-186300

(51) Int. Cl.⁷ ............................................ G01M 15/00
(52) U.S. Cl. ...................................................... 73/117.3
(58) Field of Search ............................... 73/116, 117.2, 73/117.3, 118.1; 701/101, 29, 102

(56) References Cited

U.S. PATENT DOCUMENTS

| | | | | |
|---|---|---|---|---|
| 6,446,602 B1 | * | 9/2002 | Yonezawa et al. | ..... 123/406.62 |
| 6,591,184 B2 | * | 7/2003 | Yonezawa et al. | .......... 701/113 |
| 6,644,273 B1 | * | 11/2003 | Hagari et al. | .......... 123/406.18 |
| 2002/0045984 A1 | * | 4/2002 | Yonezawa et al. | .......... 701/113 |
| 2002/0050272 A1 | * | 5/2002 | Yonezawa et al. | ..... 123/406.62 |

FOREIGN PATENT DOCUMENTS

| JP | 5-133268 | 5/1993 |
|---|---|---|
| JP | 6-146992 | 5/1994 |
| JP | 10-30489 | 2/1998 |
| JP | 11-59391 | 6/1999 |
| JP | 11-311146 | 11/1999 |
| JP | 2001-342887 | 12/2001 |

* cited by examiner

Primary Examiner—Eric S. McCall
(74) Attorney, Agent, or Firm—Sughrue Mion, PLLC

(57) ABSTRACT

A cylinder identifying apparatus has a generator which generates a cylinder discrimination signal, a generator which generates a crank angle position signal, and a control unit which obtains the number of detections of the crank angle position signal, the number of detections of the cylinder discrimination signal, the number of detections of the crank angle position signal at the time of detection of the cylinder discrimination signal, etc. The control unit sets a cylinder discrimination period B35° to B75° CA if the present reference crank position is a first-time detection result after startup, sets a cylinder discrimination period B75° to B75° CA if the present reference crank position is a second-time or some other subsequent detection result, obtains the number of detections of the cylinder discrimination signal, and identifies a cylinder on the basis of the number of pulse dropouts and the number of detections of the cylinder discrimination signal.

12 Claims, 26 Drawing Sheets

FIG. 5

| CYLINDER IDENTI-FICATION RESULTS (B75°CA POSITION) | REFERENCE CRANK ANGLE POSITION Pstd PULSE DROPOUTS (Nkake) | CYLINDER DISCRIMINATION SIGNAL Ref PULSES (Nref2) IN CYLINDER DISCRIMINATION PERIOD |
|---|---|---|
| #1 | 1 | 1 |
| #3 | 2 | 2 |
| #4 | 1 | 2 |
| #2 | 2 | 1 |

FIG. 14

| CYLINDER IDENTI-FICATION RESULTS (B75°CA POSITION) | REFERENCE CRANK ANGLE POSITION Pstd PULSE DROPOUTS (Nkake) | CYLINDER DISCRIMINATION SIGNAL Ref PULSES (Nref2) IN CYLINDER DISCRIMINATION PERIOD | LAST DETECTED Ref POSITION |
|---|---|---|---|
| #1 | 1 | 1 | IN THE VICINITY OF B95°CA |
| #2 | 2 | 0 | — |
| #3 | 1 | 0 | — |
| #4 | 1 | 2 | — |
| #5 | 2 | 1 | IN THE VICINITY OF B15°CA |
| #6 | 1 | 1 | IN THE VICINITY OF B15°CA |

FIG. 20

| CYLINDER IDENTI-FICATION RESULTS (B75°CA POSITION) | REFERENCE CRANK ANGLE POSITION Pstd PULSE DROPOUTS (Nkake) | Ref PULSES (Nref2_odd) ON ODD-NUMBER BANK SIDE | Ref PULSES (Nref2_evn) ON EVEN-NUMBER BANK SIDE |
|---|---|---|---|
| #1 | 1 | 1 [1] | 2 [1] |
| #2 | 2 | 1 [1] | 0 |
| #3 | 1 | 0 | 2 [1] |
| #4 | 1 | 2 [1] | 1 [1] |
| #5 | 2 | 0 | 1 [1] |
| #6 | 1 | 2 [1] | 0 |

FIG. 27

| CYLINDER IDENTI-FICATION RESULTS (A45°CA POSITION) | SELECTED REFERENCE CRANK ANGLE POSITION Pstd_sel PULSE DROPOUTS (Nkake) | CYLINDER DISCRIMINATION SIGNAL Ref PULSES (Nref2) IN CYLINDER DISCRIMINATION PERIOD |
|---|---|---|
| #1 | 1 | 1 |
| #2 | 1 | 2 |
| #3 | 2 | 1 |

APPARATUS FOR IDENTIFICATION OF CYLINDERS IN AN INTERNAL COMBUSTION ENGINE

BACKGROUND OF THE INVENTION

1. Field of the Invention

The present invention relates to an internal combustion engine controller for controlling timing of fuel injection, ignition, etc., with respect to each of a plurality of cylinders of an internal combustion engine on the basis of a reference position signal and a cylinder discrimination signal and, more particularly, to a cylinder identifying apparatus for an internal combustion engine capable of detecting in a short time a reference position of each of cylinders in a multicylinder internal combustion engine.

2. Description of the Related Art

In general, in the internal combustion engines for motor vehicles, etc., there is a need to control and optimize fuel injection, ignition timing, etc., according to operating conditions. Therefore, signal generation means including sensors are provided on rotational shafts of the internal combustion engine to obtain a reference position signal indicating a reference crank angle position of each cylinder and a cylinder discrimination signal for discrimination of each cylinder. Cylinder identification is performed on the basis of those signals.

For example, a conventional cylinder identifying apparatus for an internal combustion engine such as the one disclosed in Japanese Patent Laid-Open No. 6-146992 sets a reference crank angle position with respect to each of predetermined rotation angles; places a cylinder discrimination signal so that the number of generated pulses of the cylinder discrimination signal varies with respect to consecutive intervals of a crank angle position signal; and performs cylinder identification from a combination of pulses of the cylinder discrimination signal generated during consecutive two time periods.

Another conventional cylinder identifying apparatus for an internal combustion engine such as the one disclosed in Japanese Patent Laid-Open No. 11-311146 divides the above-mentioned signal interval into a plurality of time periods starting from a reference crank angle position signal, and performs cylinder identification from a combination of pulses of a cylinder discrimination signal generated during the plurality of time periods.

In the above-mentioned conventional cylinder identifying apparatuses for the internal combustion engines, cylinder identification is performed on the basis of combinations of pulses of the cylinder discrimination signal in the plurality of time periods starting from the reference crank angle position. Therefore it is necessary to detect a plurality of the reference crank angle positions before completing cylinder identification.

Also, since cylinder identification is performed only by the cylinder discrimination signal, if the discrimination signal is formed as different forms related to cylinders, the cylinder discrimination signal becomes so complicated that the cost for identification is disadvantageously high.

SUMMARY OF THE INVENTION

In view of the above-mentioned problem with the conventional art, an object of the present invention is to provide a cylinder identifying apparatus for an internal combustion engine capable of reducing the engine rotation angle required for cylinder identification at the time of startup and capable of reducing the startup time.

According to the present invention, there is provided a cylinder identifying apparatus for an internal combustion engine, including: cylinder discrimination signal generation means for generating a cylinder discrimination signal in correspondence with each of cylinders of the internal combustion engine according to the rotation of a camshaft of the internal combustion engine; and crank angle position signal generation means including a member rotating through two revolutions when the camshaft rotates through one revolution, the crank angle position signal generation means for generating a crank angle position signal including pulse dropout portions corresponding to each of the cylinders of the internal combustion engine in accordance with the rotation angle of a crankshaft of the internal combustion engine.

Further, the cylinder identifying apparatus for an internal combustion engine according to the present invention includes a control unit for detecting the crank angle position signal to obtain the number of detections of the crank angle position signal; detecting a reference crank position on the basis of one of the pulse dropout portions of the crank angle position signal; detecting the cylinder discrimination signal to obtain the number of detections of the cylinder discrimination signal; obtaining the number of detections of the crank angle position signal when the cylinder discrimination signal is detected; obtaining the number of pulse dropouts on the basis of one of the pulse dropout portions of the crank angle position signal; obtaining the number of detections of the reference crank position; and setting a first cylinder discrimination period with reference to the reference crank position when the control unit determines that the present reference crank position is the result of first-time detection after startup on the basis of the number of detections of the reference crank position.

Also, the cylinder identifying apparatus includes the control unit for setting a second cylinder discrimination period different from the first cylinder discrimination period with reference to the reference crank position when the control unit determines that the present reference crank position is the result of second-time or some other subsequent detection after the startup; obtaining the number of detections of the cylinder discrimination signal in the first or second cylinder discrimination period on the basis of the number of detections of the cylinder discrimination signal and the number of detections of the crank angle position signal at the time of detection of the cylinder discrimination signal; and identifying one of the cylinders on the basis of the number of pulse dropouts and the number of detections of the cylinder discrimination signal in the first or second cylinder discrimination period.

As a result, the crank angle required for cylinder identification may be reduced, and such an effect can be obtained that the startup time at the time of startup may be reduced.

According to the present invention, there is provided a cylinder identifying apparatus for an internal combustion engine, including: cylinder discrimination signal generation means for generating a cylinder discrimination signal in correspondence with each of cylinders of the internal combustion engine according to the rotation of a camshaft of the internal combustion engine; and crank angle position signal generation means including a member rotating through two revolutions when the camshaft rotates through one revolution, the crank angle position signal generation means for generating a crank angle position signal including pulse dropout portions corresponding to each of the cylinders of the internal combustion engine in accordance with the rotation angle of a crankshaft of the internal combustion engine.

Further, the cylinder identifying apparatus for an internal combustion engine according to the present invention includes a control unit for detecting the crank angle position signal to obtain the number of detections of the crank angle position signal; detecting a reference crank position on the basis of one of the pulse dropout portions of the crank angle position signal; detecting the cylinder discrimination signal to obtain the number of detections of the cylinder discrimination signal; obtaining the number of detections of the crank angle position signal when the cylinder discrimination signal is detected; obtaining the number of pulse dropouts on the basis of one of the pulse dropout portions of the crank angle position signal; setting a temporary cylinder discrimination period with reference to the reference crank position; and obtaining the number of detections of the cylinder discrimination signal in the temporary cylinder discrimination period on the basis of the number of detections of the cylinder discrimination signal and the number of detections of the crank angle position signal at the time of detection of the cylinder discrimination signal.

Also, the cylinder identifying apparatus includes the control unit for setting the present crank position as a selected reference crank position when the cylinder discrimination signal is detected in the temporary cylinder discrimination period; setting a cylinder discrimination period with reference to the selected reference crank position; obtaining the number of detections of the cylinder discrimination signal in the cylinder discrimination period on the basis of the number of detections of the cylinder discrimination signal and the number of detections of the crank angle position signal at the time of detection of the cylinder discrimination signal; and identifying one of the cylinders on the basis of the number of pulse dropouts and the number of detections of the cylinder discrimination signal in the cylinder discrimination period.

As a result, the crank angle required for cylinder identification may be reduced, and such an effect can be obtained that the startup time at the time of startup may be reduced.

BRIEF DESCRIPTION OF THE DRAWINGS

In the accompanying drawings:

FIG. 5 is a table showing conditions for identification of cylinders on the basis of combinations of numbers of cylinder discrimination signal Ref pulses (Nref2) and reference crank angle positions Pstd determined from the number of pulse dropouts (Nkake) in Embodiment 1 of the present invention;

FIG. 14 is a diagram showing conditions for identification of cylinders on the basis of combinations of numbers of cylinder discrimination signal Ref pulses (Nref2) and reference crank angle positions Pstd determined from the number of pulse dropouts (Nkake) in Embodiment 2 of the present invention;

FIG. 20 is a table showing conditions for identification of cylinders on the basis of combinations of the numbers of cylinder discrimination signal Ref pulses (Nref2_odd, Nref2_evn) and reference crank angle positions Pstd determined from the number of pulse dropouts (Nkake) in Embodiment 3 of the present invention;

FIG. 27 is a table showing conditions for identification of cylinders on the basis of combinations of numbers of cylinder discrimination signal Ref pulses (Nref2) and reference crank angle positions Pstd determined from the number of pulse dropouts (Nkake) in Embodiment 4 of the present invention;

DESCRIPTION OF THE PREFERRED EMBODIMENTS

Embodiment 1

Figure 1:
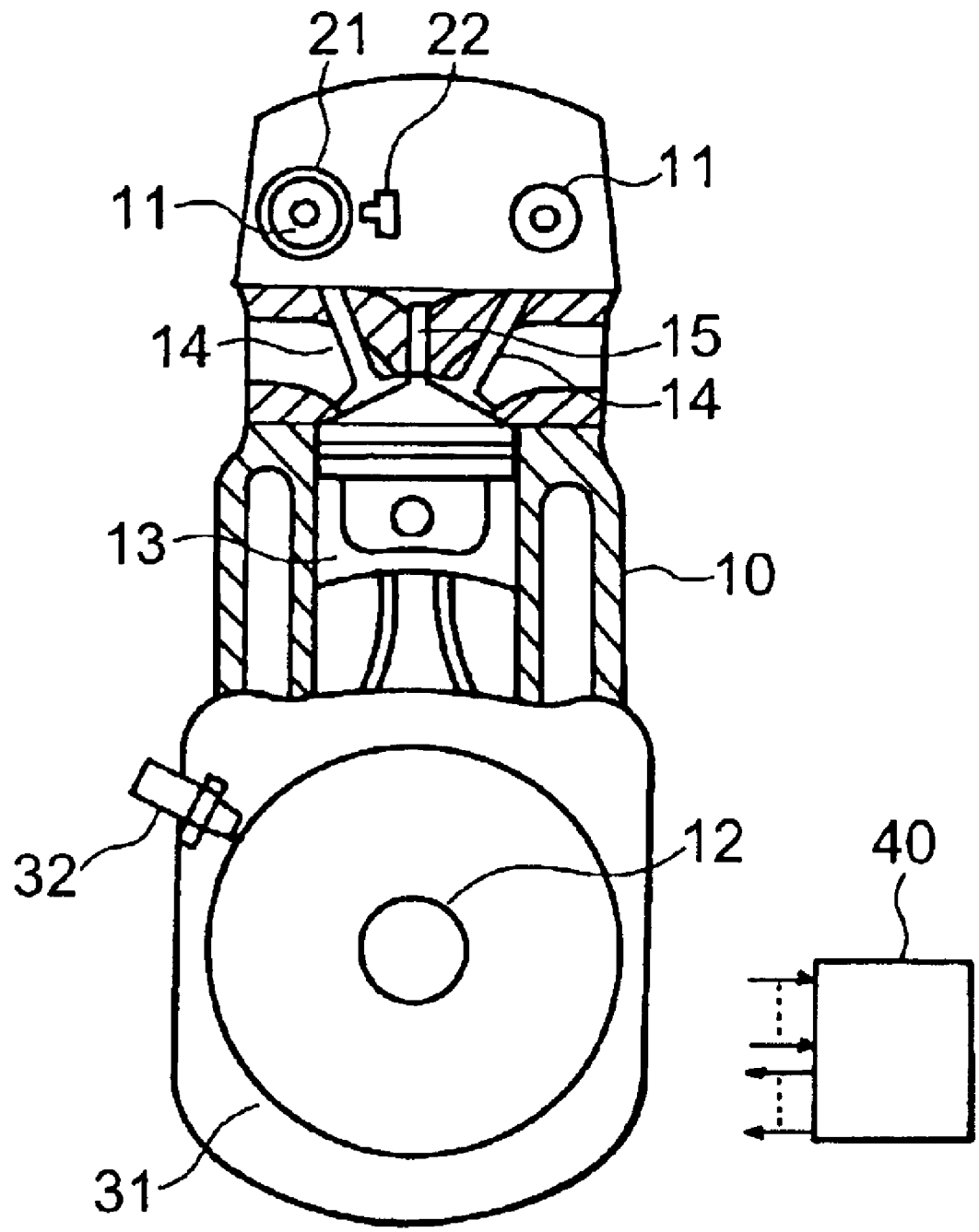
FIG. 1 is a diagram schematically showing the structure of a four-cylinder internal combustion engine relating to Embodiment 1 of the present invention.
Figure 2:
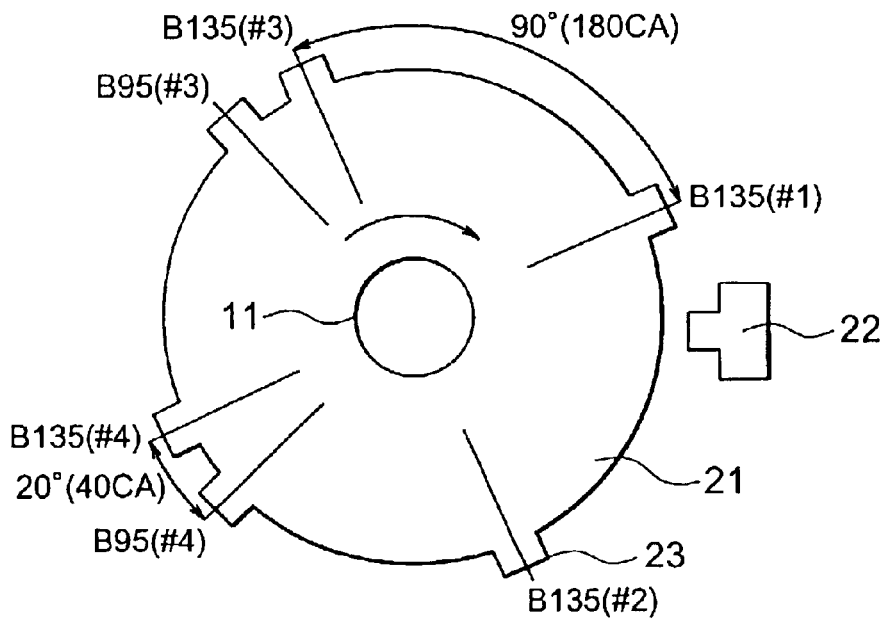
FIG. 2 is a diagram showing a concrete example of a configuration of a signal plate in cylinder discrimination signal generation means in Embodiment 1 of the present invention.
Figure 3:
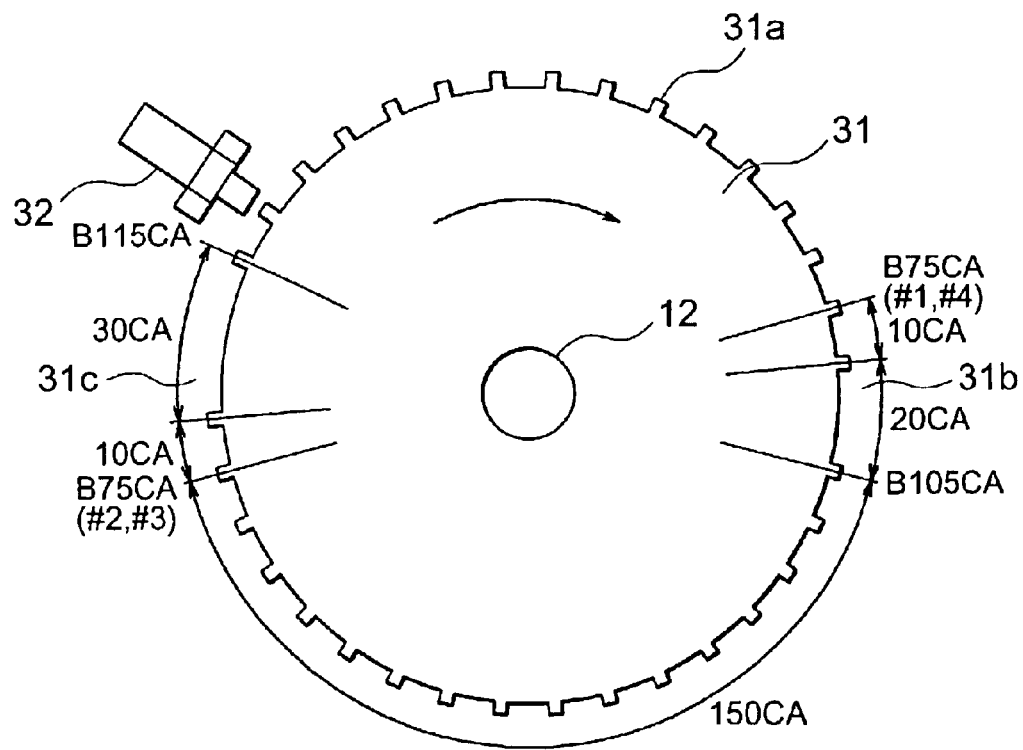
FIG. 3 is a diagram showing a concrete example of a configuration of a signal plate in crank angle position signal generation means in Embodiment 1 of the present invention.

A cylinder identifying apparatus for an internal combustion engine which represents Embodiment 1 of the present invention will be described with reference to the accompanying drawings. FIG. 1 is a diagram showing the structure of a four-cylinder internal combustion engine having a well-known variable valve timing (VVT) mechanism (not shown) in Embodiment 1 of the present invention. FIG. 2 is a diagram showing a concrete example of a configuration of a signal plate in cylinder discrimination signal generation means in Embodiment 1 of the present invention. FIG. 3 is a diagram showing a concrete example of a configuration of a signal plate in crank angle position signal generation means in Embodiment 1 of the present invention. In the figures, components identical or corresponding to each other are indicated by the same reference characters.

In FIG. 1 are illustrated an internal combustion engine 10, a camshaft 11, a crankshaft 12, a piston 13, valves 14, and an ignition plug 15. A signal plate 21 and a sensor 22 constitute cylinder discrimination signal generation means. A signal plate 31 and a sensor 32 constitute crank angle position signal generation means. A control unit 40 is provided which includes a central processing unit (CPU) and a memory, and to which the sensor 22 and the sensor 32 are connected.

In FIG. 2 are illustrated the camshaft 11, the signal plate 21 of the cylinder discrimination signal generation means, the sensor 22, and a plurality of projections 23. The projections 23 are formed in positions indicated in the figure.

In FIG. 3 are illustrated the crankshaft 12, the signal plate 31 of the crank angle position signal generation means, a plurality of projections 31a, pulse dropout portions 31b and 31c, and the sensor 32. The projections 31a are formed in positions indicated in the figure. The signal plate 31 and the sensor 32 constitute the crank angle position generation means.

The camshaft 11 is connected to the crankshaft 12 through a mechanical transmission means such as a timing belt. When the crankshaft 12 rotates through two revolutions, the camshaft 11 rotates through one revolution. As the signal plate 21 of the cylinder discrimination signal generation means attached to the camshaft 11 to which the VVT mechanism is connected is rotated, the sensor 22 detects the projections 23 to generate a cylinder discrimination signal Ref.

As the signal plate 31 of the crank angle signal generation means attached to the crankshaft 12 is rotated, the sensor 32 detects the projections 31a to generate a crank angle position signal Pos.

Figure 4:
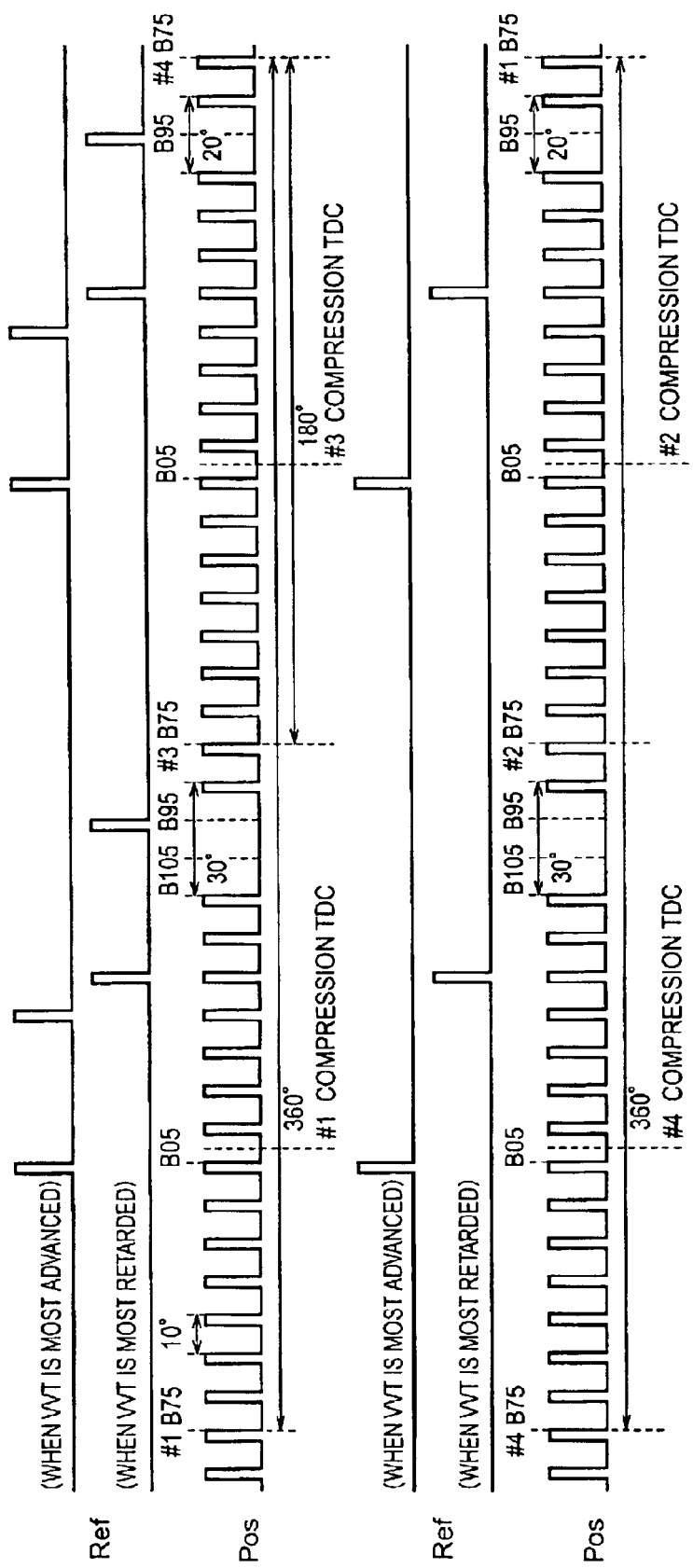
FIG. 4 is a timing chart showing the pulse waveforms of cylinder discrimination signal Ref and crank angle position signal Pos in Embodiment 1 of the present invention.

FIG. 4 shows patterns of cylinder discrimination signal Ref and crank angle position signal Pos. As patterns of cylinder discrimination signal Ref, both a pattern when the VVT is most advanced (to 50° CA (crank angle)) and a pattern when the VVT is most retarded are shown.

Crank angle position signal Pos rises each time the rotation angle of the crankshaft is increased by 10° CA. The one-pulse dropout portion 31b in the signal plate 31 corresponds to the position at 95° CA before the top dead center (hereinafter referred to as B95° CA), which is represented by a pulse dropout in crank angle position signal Pos. The two-pulse dropout portion 31c in the signal plate 31 corresponds to the positions at B95° CA and B105° CA, which is represented by pulse dropouts in crank angle position signal Pos. From these pulse dropouts of the signal corresponding to the number of pulse dropouts, a B75° CA position is determined as a reference crank angle position Pstd.

A total of four reference crank angle positions Pstd corresponding to the cylinders are determined in terms of the number of pulse dropouts (Nkake), as shown below.

Pstd corresponding to #1 and #4: Nkake=1
Pstd corresponding to #2 and #3: Nkake=2
Symbols #1 to #4 are cylinder numbers.

A cylinder discrimination period for the desired number of detections of crank angle position signal Pos or reference crank angle position detection is ordinarily set between the above-mentioned reference crank angle positions B75° CA (180° CA). However, for first-time reference crank angle position detection after startup, a cylinder discrimination period is set between B35° CA and B75° CA (140° CA) to perform cylinder discrimination at an earlier time by considering the ordinary engine stop position in order that the rotation angle necessary for cylinder discrimination be reduced.

By considering the phase difference between the crankshaft 12 and the camshaft 11 including the time of VVT operation and the reduction in cylinder discrimination period at the time of startup, cylinder discrimination signal Ref is placed so that a predetermined number of pulses of cylinder discrimination signal Ref are output in a cylinder discrimination period. In Embodiment 1, cylinder discrimination signal Ref is placed as shown below.

Between #1 B35° CA and #3 B75° CA: Nref2=1,
Between #3 B35° CA and #4 B75° CA: Nref2=2,
Between #4 B35° CA and #2 B75° CA: Nref2=2, and
Between #2 B35° CA and #1 B75° CA: Nref2=1.

As described above, with respect to each reference crank angle position Pstd determined when a cylinder discrimination period is set, the corresponding cylinder can be identified from the combination of the reference crank angle position Pstd determined in terms of the number of pulse dropouts (Nkake) and the number of cylinder discrimination signal Ref pulses (Nref2), as shown in FIG. 5.

Figure 6:
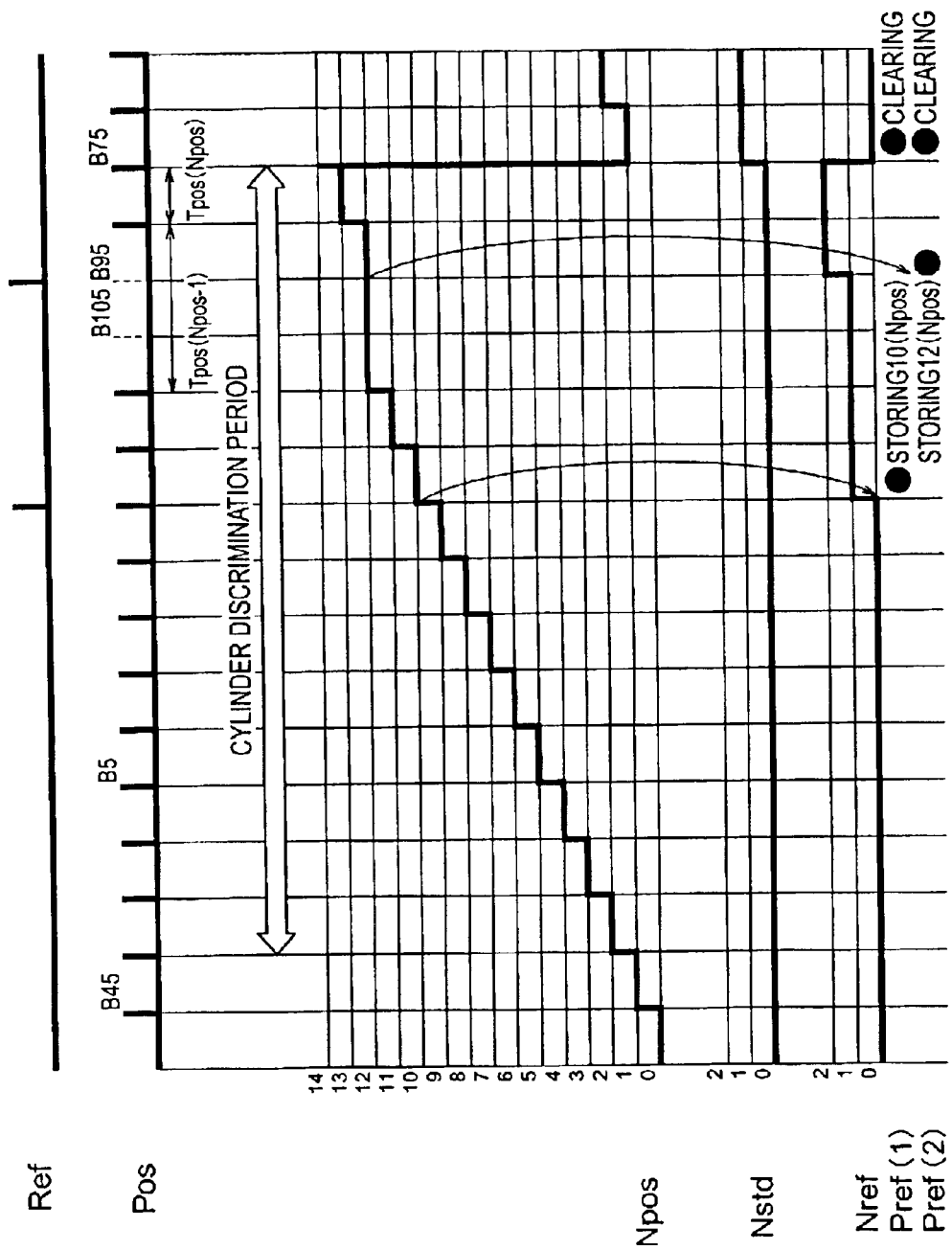
FIG. 6 is a timing chart showing the pulse waveforms of signals Ref and Pos and control variables Npos, Nstd, Nref, Pref, and Tpos in startup cylinder discrimination operation from B45° CA in Embodiment 1 of the present invention.
Figure 7:
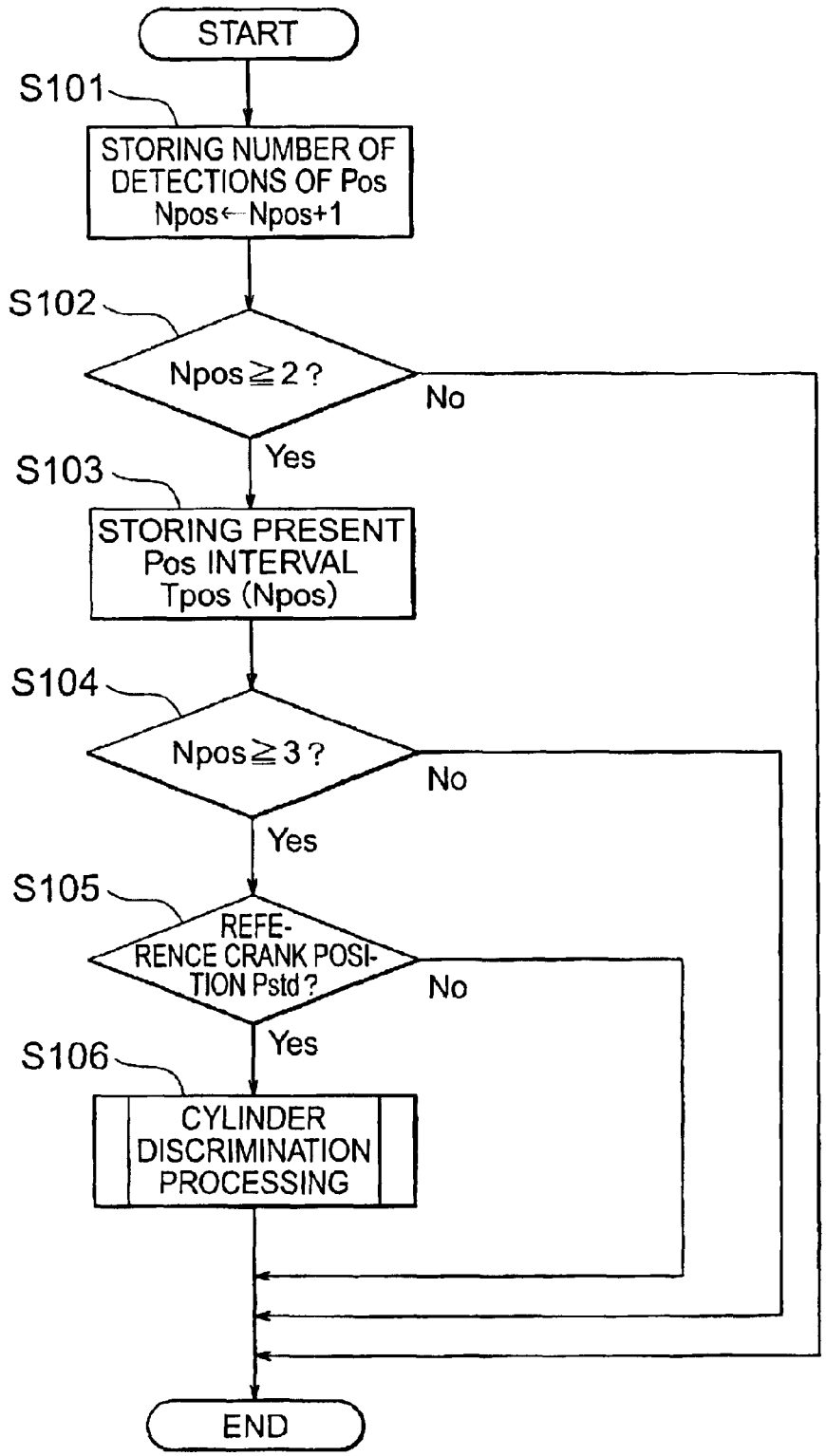
FIG. 7 is a flowchart showing steps of processing at the time of Pos input in Embodiment 1 of the present invention.

FIG. 6 is a diagram showing an example of a method of identifying cylinders at the time of startup in a case where the crank angle signal is detected immediately before B45° CA in the vicinity of the ordinary engine stop angle in the four-cylinder engine (when the VVT is most retarded). FIG. 7 shows processing in the control unit 40 at the time of Pos input, FIG. 8 shows processing in the control unit 40 at the time of Ref input, and FIG. 9 shows cylinder discrimination processing in step S106 executed after Pstd determination in step S105 in processing at the time of Pos input.

The operation of the cylinder identifying apparatus for an internal combustion engine in Embodiment 1 of the present invention will now be described with reference to the drawings.

Figure 8:
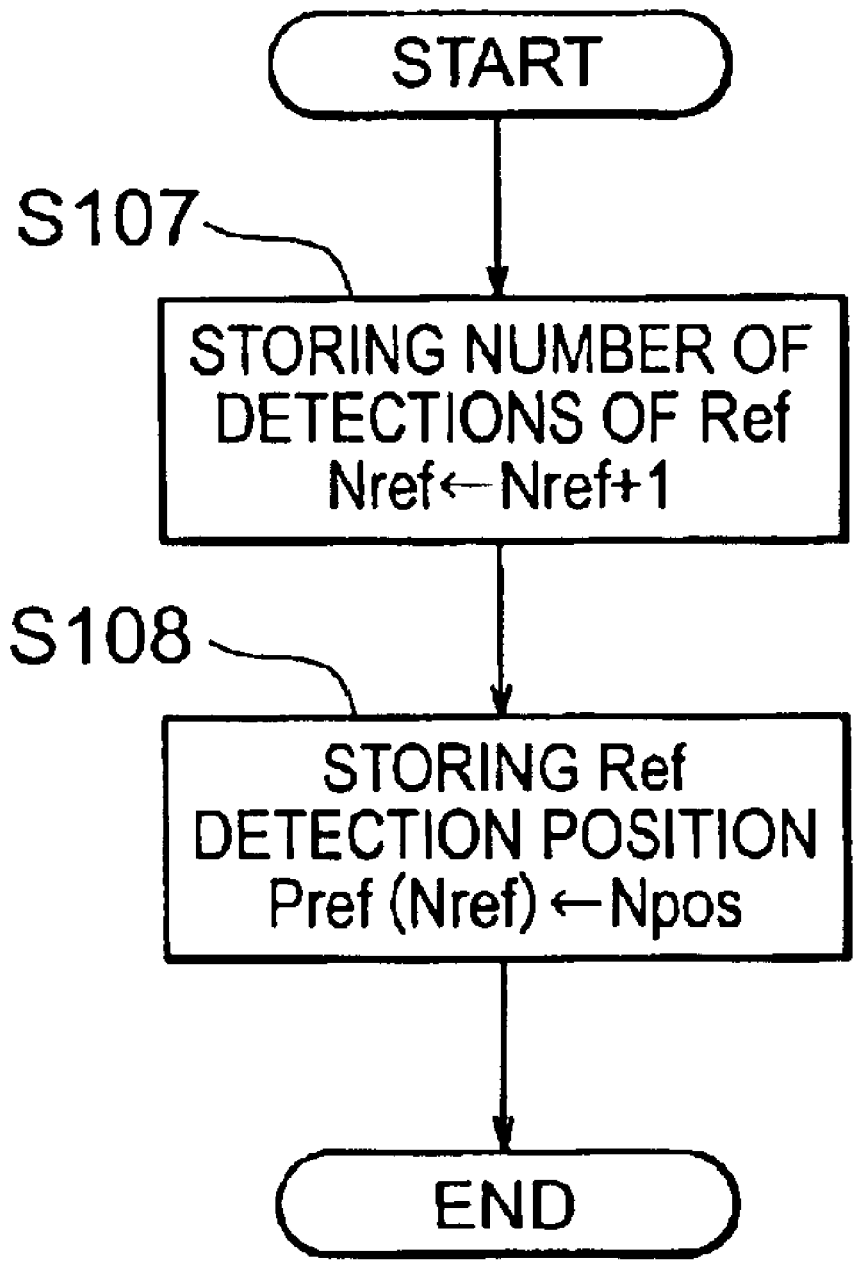
FIG. 8 is a flowchart showing steps of processing at the time of Ref input in Embodiment 1 of the present invention.
Figure 9:
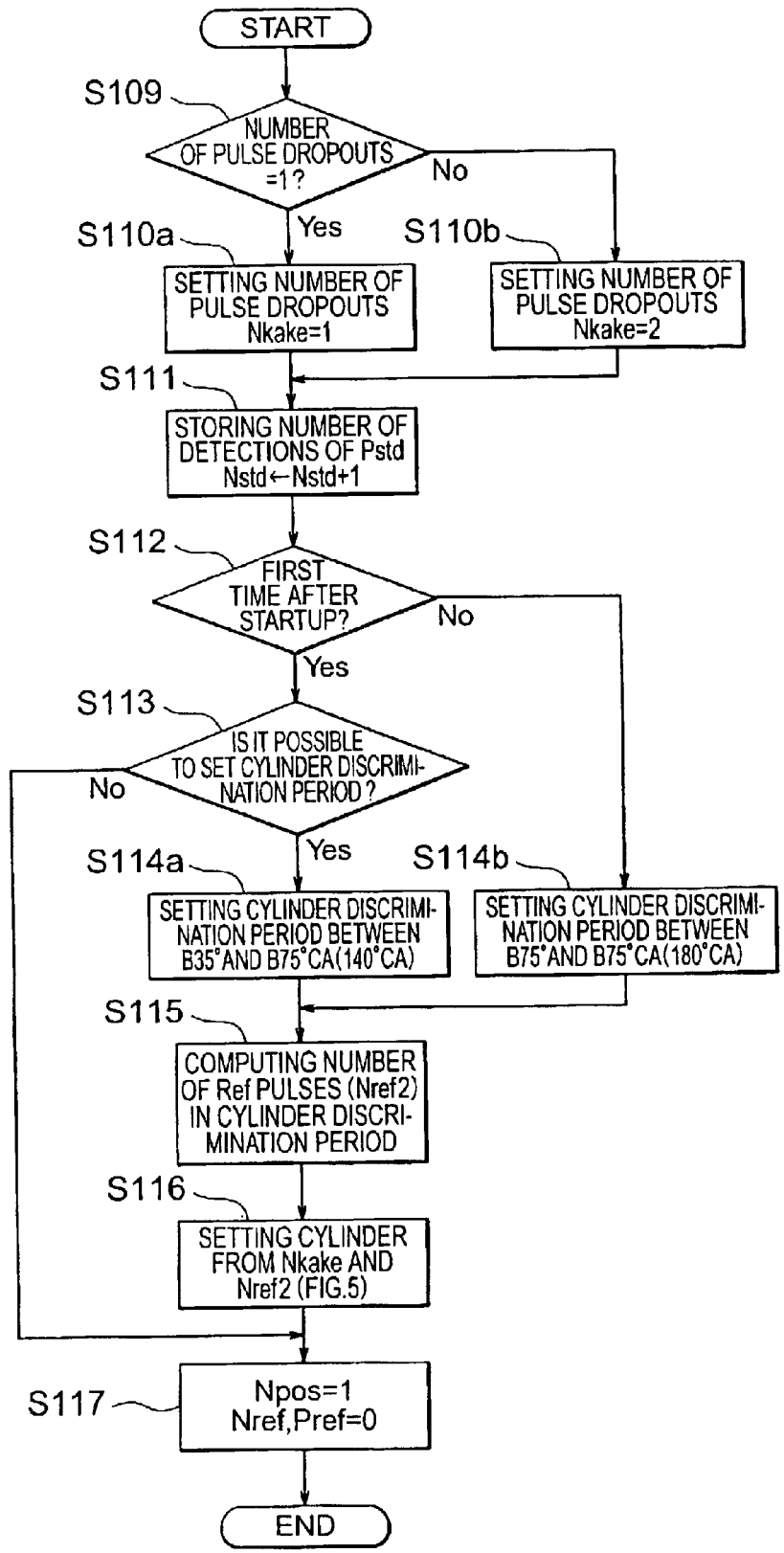
FIG. 9 is a flowchart showing steps of cylinder discrimination processing in Embodiment 1 of the present invention.

Before startup of the engine, variables Npos, Nref, and Nstd used in processings shown in FIGS. 7 to 9 are cleared to 0.

At the time of Pos input, the number of Pos detections Npos is counted up in step S101 shown in FIG. 7. If the result of determination in step S102 is Npos≧2, the time period between the preceding and present Pos pulses is stored as Tpos (Npos) in step S103. If the result of determination in step S104 is Npos≧3, reference crank position Pstd is determined in step S105.

As a means for determination of reference crank position Pstd, preceding Pos-present Pos time period Tpos (Npos−1) exists, for example. Therefore Tpos (Npos−1)/Tpos (Npos) is computed and the result of this computation is compared with a pulse dropout discriminant value k1. This discriminant value k1 is used in common in two cases of determination of reference crank position Pstd corresponding to one pulse dropout and a pair of pulse dropouts. For example, discriminant value k1 is 1.5. If it is determined that Tpos (Npos−1)/Tpos (Npos)>k1 (=1.5), that is, the present Pos is determined as corresponding to Pstd, cylinder recognition processing in step S106 is executed.

In the example shown in FIG. 6, Tpos (Npos−1)/Tpos (Npos)>k1 is established at the time of the 14th Pos input (Npos=14), reference crank position Pstd is then determined and cylinder discrimination processing is executed. That is, Tpos (13)/Tpos (14)=3>1.5 is established.

On the other hand, at the time of Ref input, the number of Ref detections Nref is counted up in step S107 shown in FIG. 8. Npos at the corresponding time is stored in Ref detection position Pref (Nref) in step S108. Pos at the time of Ref detection is thereby made definite to enable computation of the number of Ref pulses (Nref2) in a cylinder discrimination period in step S106.

As shown in FIG. 6, Ref input occurs when Npos=10 and when Npos=12. Pref (1)=10 is stored at the first occurrence of Ref input, and Pref (2)=12 is stored at the second occurrence of Ref input. Since Nref is counted up each time Ref input occurs, Nref=2 at the time of execution of cylinder discrimination processing (Npos=14).

In cylinder discrimination processing in step S106 executed when reference crack position Pstd is determined, the result of the above-mentioned Tpos (Npos−1)/Tpos (Npos) is first compared with a pulse dropout discriminant value k2 in step S109 shown in FIG. 9. By using this discriminant value k2, one pulse dropout or a pair of pulse dropouts is determined. For example, discriminant value k2 is 2.5.

When Tpos (Npos−1)/Tpos (Npos)≦k2, the number of pulse dropouts (Nkake)=1 corresponding to the present Pstd is set in step S110a. In the other case, i.e., when Tpos (Npos−1)/Tpos (Npos)>k2, the number of pulse dropouts (Nkake)=2 corresponding to the present Pstd is set in step S110b. In the case shown in FIG. 6, since Tpos (Npos−1)/Tpos (Npos) (=3)>k2 (=2.5), Nkake=2 is set.

In step S111, the number of Pstd detections Nstd is counted up. In step S112, a determination is made as to whether the present Pstd is the result of first-time detection after the startup.

If Nstd=1, i.e., the present Pstd is the result of first-time detection after the startup, a determination is made from Npos+Nkake in step S113 as to whether after the startup the rotation angle has become large enough to set a cylinder discrimination period.

If Npos+Nkake≧15 and it is determined that a cylinder discrimination period can be set, a cylinder discrimination period is set between B35° CA and B75° CA (140° CA) in step S114a. If Npos+Nkake<15 and it is determined that the angle is not sufficiently large, a jump to step S117 is made and Npos, Nref, and Pref are cleared to set Npos=1, Nref=0, and Pref=0, thereby terminating the processing.

On the other hand, if the result of determination in step S112 is that Nstd>1, i.e., the present Pstd is the result of second-time or some other subsequent detection after the startup, a cylinder discrimination period is set between B75° CA and B75° CA (180° CA) in step S114b.

In the case shown in FIG. 6, Nstd=Nstd+1=0+1=1 and it is determined that the present Pstd is the result of first-time detection after the startup. Then, from Npos+Nkake=14+2=16≧15, it is determined that a cylinder discrimination period can be set, and a cylinder discrimination period is set between B35° CA and B75° CA (140° CA) corresponding to Npos=2 to 14.

After a cylinder discrimination period has been set as described above, the number of Ref pulses (Nref2) in the cylinder discrimination period is obtained from Nref and Pref (1) to Pref (Nref). From Pref (1) to Pref (Nref), Nref2 can easily be obtained by subtraction from Nref if a Ref pulse out of the set cylinder discrimination period is included in the count.

In the case shown in FIG. 6, Pref (1)=10 and Pref (2)=12, it is therefore determined that both the two Ref pulses are obtained in the cylinder discrimination period (Npos=2 to 14), and Nref2=Nref=2 is obtained.

Nkake and Nref2 are obtained by the above-mentioned processing to enable in step S116 cylinder identification by referring to the table shown in FIG. 5. In the case shown in FIG. 6, the cylinder #3 at B75° CA can be identified from Nkake=2 and Nref2=2. Finally, Npos, Nref and Pref are cleared to set Npos=1, Nref=0, and Pref=0, and the processing ends.

While an example of cylinder identification at Pstd=1 has been described with reference to FIG. 6, a situation where the Pos is detected, for example, from the B05° CA position shown in FIG. 6 should be considered, although the frequency of its occurrence is low. In this case, Npos+Nkake<15 at the time point corresponding to Pstd=1 and the angular value large enough to set a cylinder discrimination period is not reached. In this case, as is also apparent from the flowcharts shown in FIGS. 7 to 9, cylinder discrimination is performed at Pstd=2. As described above, cylinder discrimination is performed only after a reliable result of detection of Ref has been obtained, thus preventing misidentification of each cylinder. Also, a situation where Ref is shifted in the advance direction, for example, by an amount of about 50° CA by the VVT mechanism is also mentioned, although the frequency of its occurrence is low. Even in such a situation, since an adequate cylinder discrimination period is set, Ref can be detected with reliability to ensure correct cylinder identification.

That is, the cylinder identifying apparatus for an internal combustion engine in Embodiment 1 has cylinder discrimination signal generation means 21 and 22 which generate a cylinder discrimination signal Ref in correspondence with each of cylinders of an internal combustion engine according to the rotation of the camshaft 11, crank angle position signal generation means 31 and 32 which include a member rotating through two revolutions when the camshaft rotates through one revolution, and which generate a crank angle position signal Pos including pulse dropout portions corresponding to the cylinders of the internal combustion engine according to the rotation angle of the crankshaft 12 of the internal combustion engine, and a control unit 40 which detects the crank angle position signal to obtain the number of detections Npos of the crank angle position signal, detects a reference crank position Pstd on the basis of one of the pulse dropout portions of the crank angle position signal, detects the cylinder discrimination signal to obtain the number of detections Nref of the cylinder discrimination signal, obtains the number of detections Pref (Nref) of the crank angle position signal when the cylinder discrimination signal is detected, obtains the number of pulse dropouts Nkake on the basis of each of the pulse dropout portions of the crank angle position signal, and obtains the number of detections Nstd of the reference crank position. The control unit 40 sets a first cylinder discrimination period from B35° CA to B75° CA (140° CA) with reference to the reference crank position when it determines that the present reference crank position is the result of first-time detection after startup on the basis of the number of detections of the reference crank position. The control unit 40 sets a second cylinder discrimination period from B75° CA to B75° CA (180° CA) different from the first cylinder discrimination period with reference to the reference crank position when it determines that the present reference crank position is the result of second-time or some other subsequent detection after the startup. The control unit 40 obtains the number of detections Nref2 of the cylinder discrimination signal in the first or second cylinder discrimination period on the basis of the number of detections Nref of the cylinder discrimination signal and the number of detections Pref (Nref) of the crank angle position signal at the time of detection of the cylinder discrimination signal. The control unit 40 identifies one of the cylinders on the basis of the number Nkake of pulse dropouts and the number of detections Nref2 of the cylinder discrimination signal in the first or second cylinder discrimination period.

Embodiment 2

Figure 10:
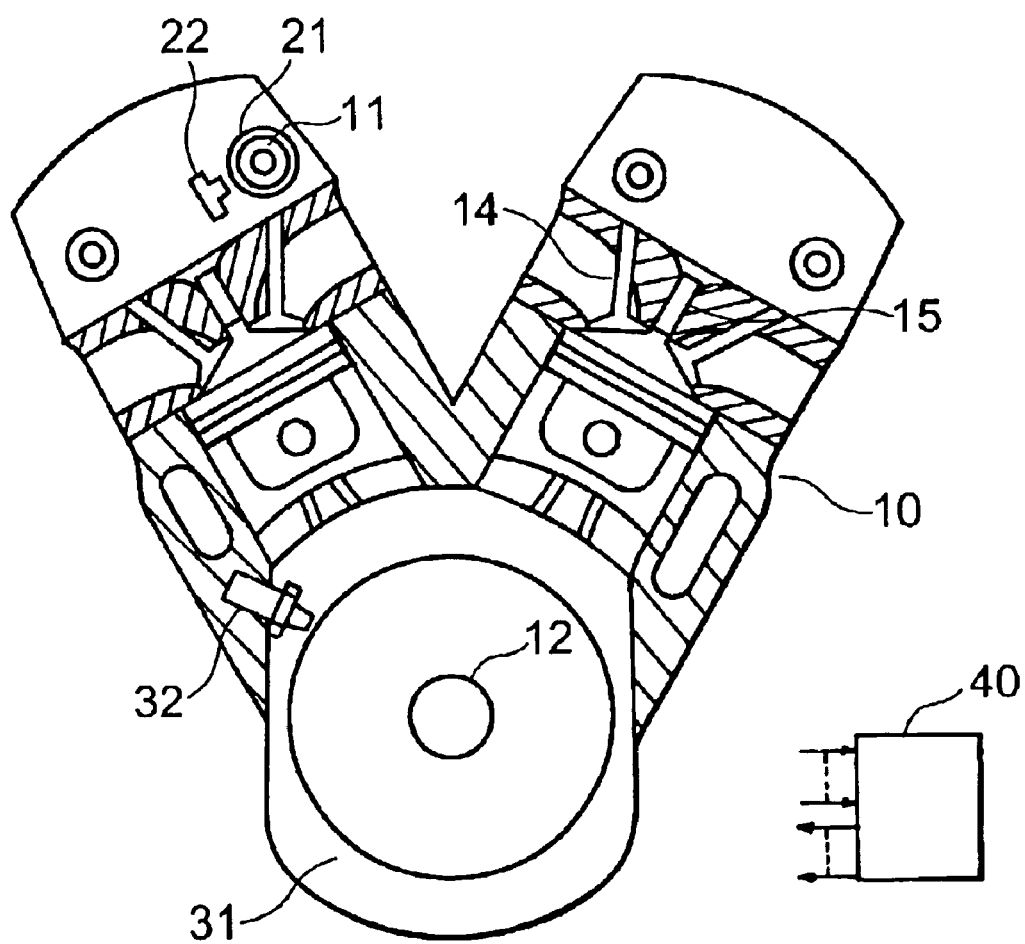
FIG. 10 is a diagram schematically showing the structure of a six-cylinder internal combustion engine relating to Embodiment 2 of the present invention.

A cylinder identifying apparatus for an internal combustion engine which represents Embodiment 2 of the present invention will be described with reference to the accompanying drawings. FIG. 10 is a diagram showing the structure of a V6-cylinder internal combustion engine not having a VVT according to Embodiment 2 of the present invention.

Figure 11:
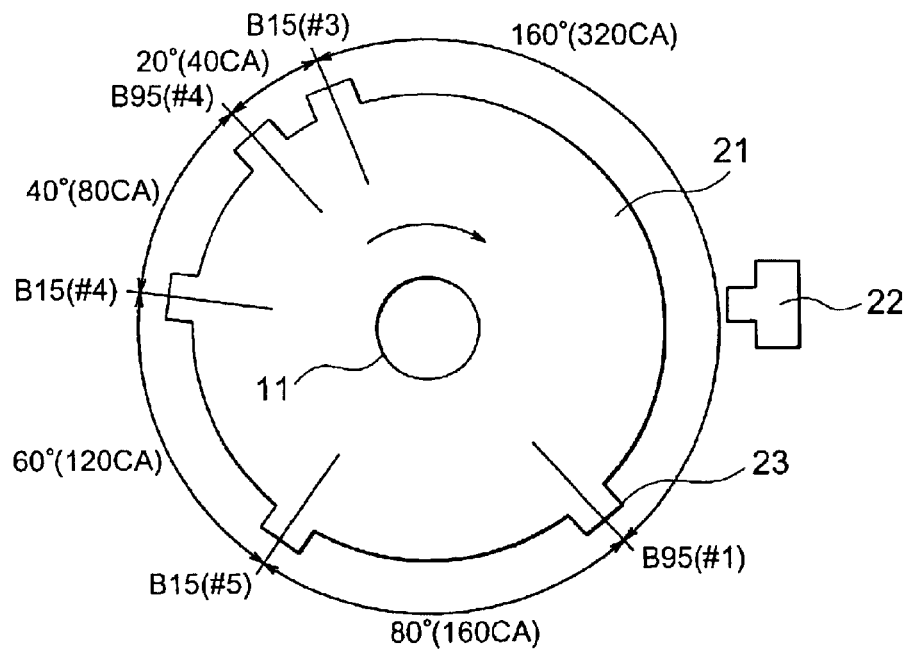
FIG. 11 is a diagram showing a concrete example of a configuration of a signal plate in cylinder discrimination signal generation means in Embodiment 2 of the present invention.

FIG. 11 is a diagram showing a concrete example of a configuration of a signal plate in cylinder discrimination signal generation means in Embodiment 2 of the present invention. Also, FIG. 12 is a diagram showing a concrete example of a configuration of a signal plate in crank angle position signal generation means in Embodiment 2 of the present invention.

In FIG. 10 are illustrated an internal combustion engine 10, a camshaft 11, a crankshaft 12, valves 14, and an ignition plug 15. A signal plate 21 and a sensor 22 constitute cylinder discrimination signal generation means. A signal plate 31 and a sensor 32 constitute crank angle position signal generation means. A control unit 40 is provided which includes a central processing unit (CPU) and a memory, and to which the sensor 22 and the sensor 32 are connected.

In FIG. 11 are illustrated the camshaft 11, the signal plate 21 of the cylinder discrimination signal generation means, the sensor 22, and a plurality of projections 23. The projections 23 are formed in positions indicated in the figure. The signal plate 21 and the sensor 22 constitute cylinder discrimination signal generation means.

Figure 12:
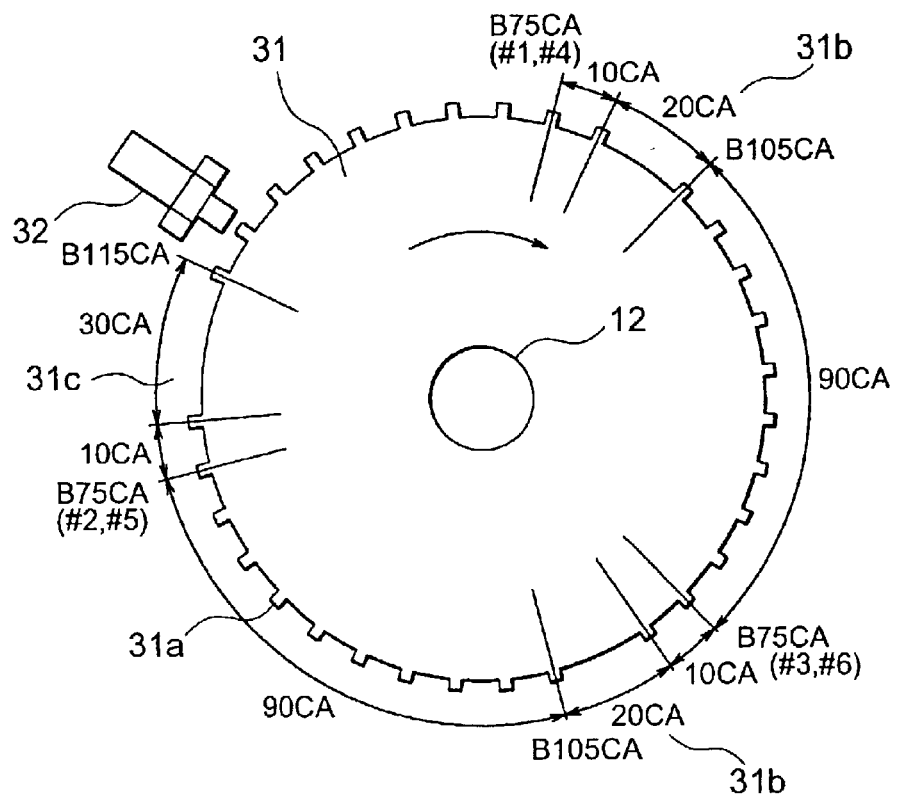
FIG. 12 is a diagram showing a concrete example of a configuration of a signal plate in crank angle position signal generation means in Embodiment 2 of the present invention.

In FIG. 12 are illustrated the crankshaft 12, the signal plate 31 of the crank angle position signal generation means, a plurality of projections 31*a*, pulse dropout portions 31*b* and 31*c*, and the sensor 32. The plurality of projections 31*a* are formed in positions indicated in the figure. The signal plate 31 and the sensor 32 constitute crank angle position signal generation means.

Figure 13:
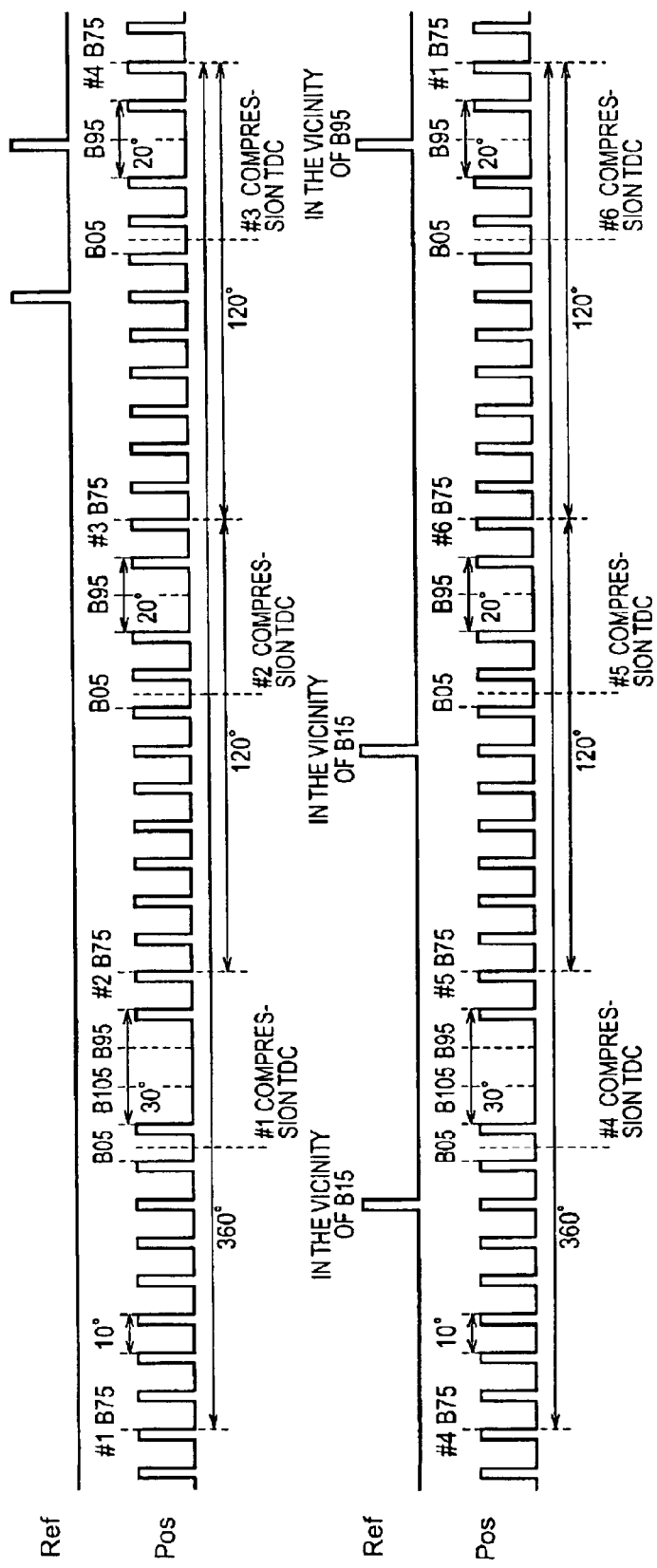
FIG. 13 is a timing chart showing the pulse waveforms of cylinder discrimination signal Ref and crank angle position signal Pos in Embodiment 2 of the present invention.

FIG. 13 shows patterns of cylinder discrimination signal Ref and crank angle position signal Pos of a 6-cylinder engine. Cylinder discrimination signal Ref and crank angle position signal Pos are generated by the same method as that in Embodiment 1.

Crank angle position signal Pos rises each time the rotation angle of the crankshaft is increased by 10° CA. The one-pulse dropout portion 31*b* in the signal plate 31 corresponds to the position at B95° CA. The two-pulse dropout portion 31*c* in the signal plate 31 corresponds to the positions at B95 and B105° CA. From these pulse dropouts of the signal corresponding to the number of pulse dropouts, a B75° CA position is determined as a reference crank angle position Pstd. A total of six reference crank angle positions Pstd are determined in terms of the number of pulse dropouts (Nkake), as shown below.

Pstd corresponding to #1, #3, #4 and #6: Nkake=1
Pstd corresponding to #2 and #5: Nkake=2

A cylinder discrimination period for the desired number of detections of crank angle position signal Pos or reference crank angle position detection is ordinarily set between the above-mentioned reference crank angle positions B75° CA (120° CA). However, for first-time reference crank angle position detection after startup, a cylinder discrimination period is set between B35° CA and B75° CA (80° CA) to perform cylinder discrimination at an earlier time by considering the ordinary engine stop position in order that the rotation angle necessary for cylinder discrimination be reduced.

In Embodiment 2, by considering the phase difference between the crankshaft 12 and the camshaft 11 and the reduction in cylinder discrimination period at the time of startup, cylinder discrimination signal Ref is placed so that a predetermined number of pulses of cylinder discrimination signal Ref are output in a cylinder discrimination period. Also, for the purpose of simplifying the Ref signal, the Ref position with respect to Pos is changed to enable cylinder discrimination using a reduced number of pulses of the Ref signal.

Between #1 B35° CA and #2 B75° CA: Nref2=0,
Between #2 B35° CA and #4 B75° CA: Nref2=0,
Between #3 B35° CA and #3 B75° CA: Nref2=2,
Between #4 B35° CA and #5 B75° CA: Nref2=2 (in the vicinity of B15° CA),
Between #5 B35° CA and #6 B75° CA: Nref2=1 (in the vicinity of B15° CA), and
Between #6 B35° CA and #1 B75° CA: Nref2=1 (in the vicinity of B95° CA).

As described above, with respect to each reference crank angle position Pstd determined when a cylinder discrimination period is set, the corresponding cylinder can be identified from the combination of the reference crank angle position Pstd determined in terms of the number of pulse dropouts (Nkake), the number of cylinder discrimination signal REF pulses (Nref2), and the Ref position (Pref2) as shown in FIG. 14.

Figure 15:
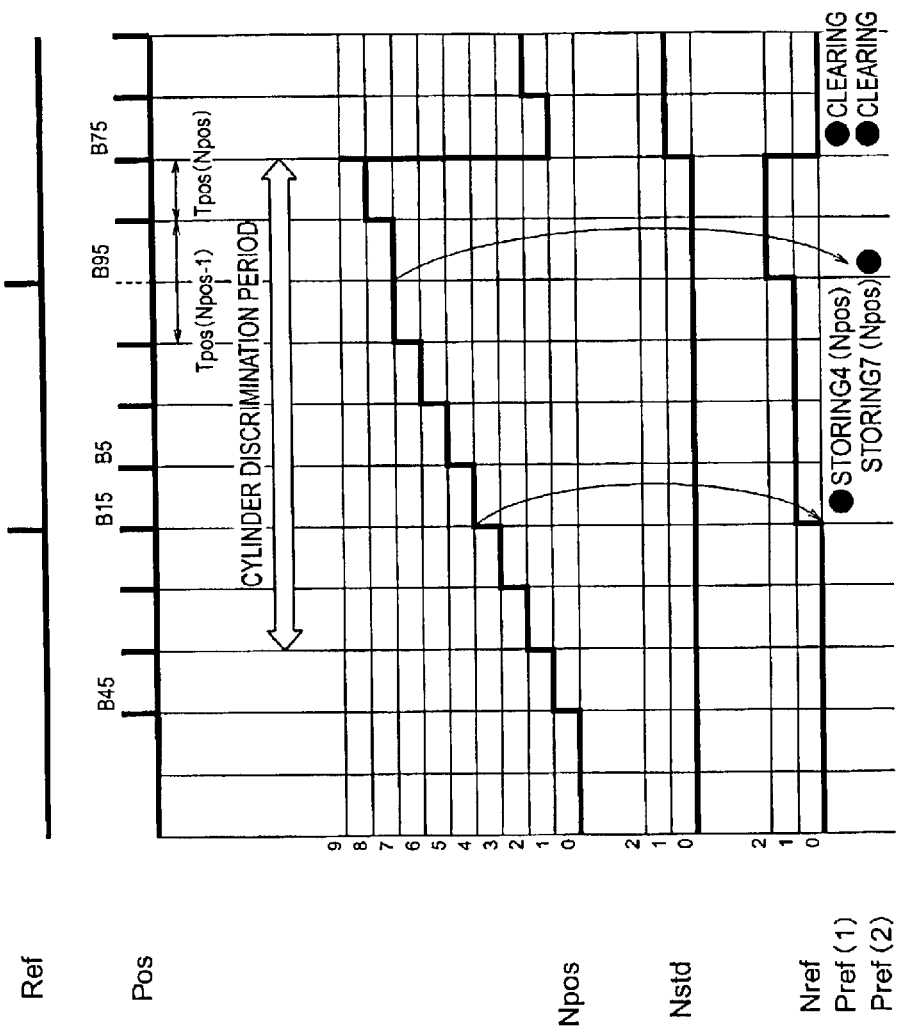
FIG. 15 is a timing chart showing the pulse waveforms of signals Ref and Pos and control variables Npos, Nstd, Nref, Pref, and Tpos in startup cylinder discrimination operation from B45° CA in Embodiment 2 of the present invention.
Figure 16:
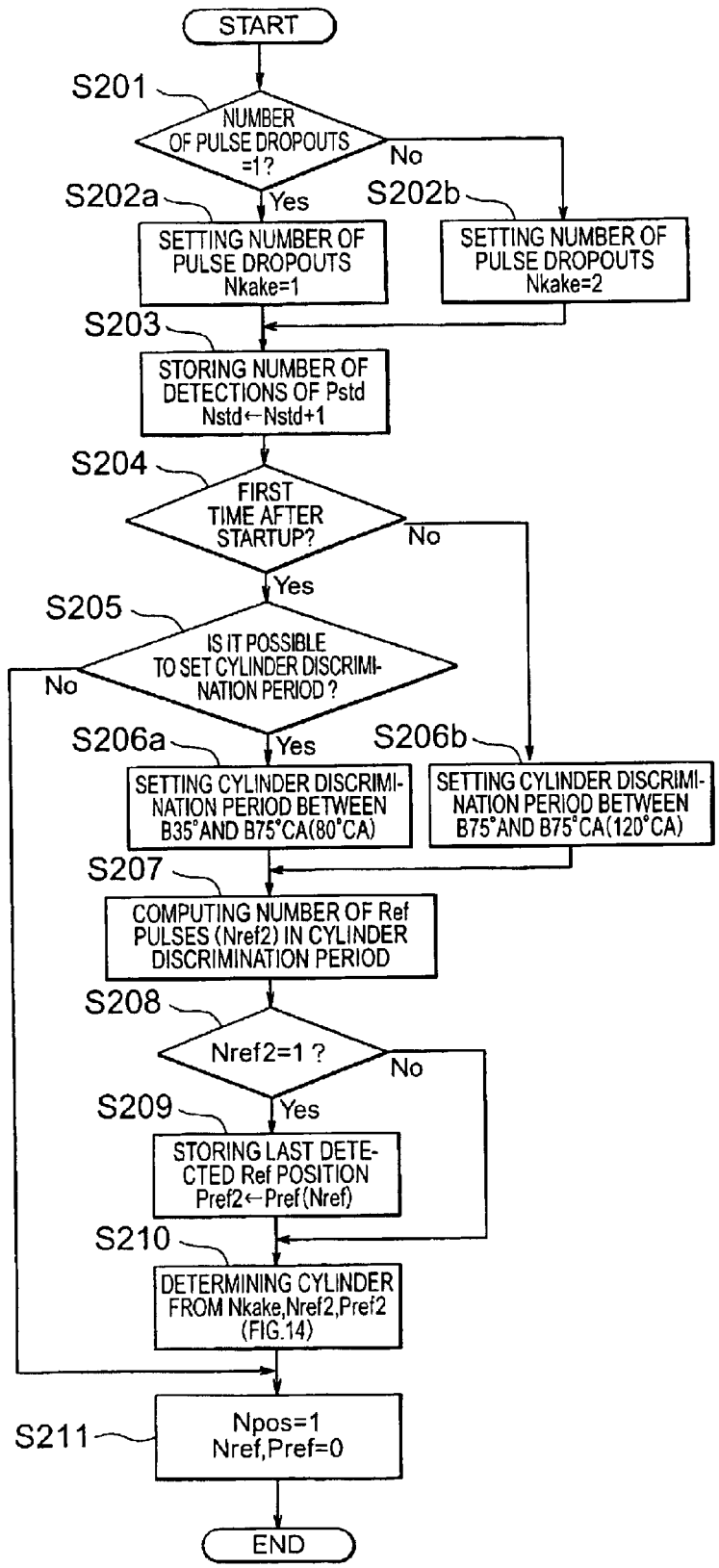
FIG. 16 is a flowchart showing steps of cylinder discrimination processing in Embodiment 2 of the present invention.

FIG. 15 a diagram showing an example of a method of identifying cylinders at the time of startup in a case where the crank angle signal is detected immediately before B45° CA in the vicinity of the ordinary engine stop angle in the six-cylinder engine. Processing at the time of Pos input and processing at the time of Ref input in the control unit 40 are the same as those in Embodiment 1 described above. FIG. 16 shows cylinder discrimination processing in step S106 executed after Pstd determination in step S105 in processing at the time of Pos input. Variables Npos, Nref, and Nstd used in the above-mentioned processings are cleared to 0 before startup of the engine.

At the time of Pos input, reference crank position Pstd is determined by the same method as that in Embodiment 1 described above. Cylinder discrimination processing described below is executed at the time of Pstd determination. In the case shown in FIG. 15, Tpos (Npos−1)/Tpos (Npos)>k1 shown above in the description of Embodiment 1 is established at the time of the ninth Pos input (Npos=9), reference crank position Pstd is thereby determined, and cylinder discrimination processing is then executed.

Also at the time of Ref input, Npos and Pref (Nref) are obtained by the same method as that in Embodiment 1. Pos at the time of Ref detection is thereby made definite to enable computation of the number of Ref pulses (Nref2) in a cylinder discrimination period described below. When Nref2=1, the Pref position is also used for cylinder discrimination.

In the case shown in FIG. 15, Ref input occurs when Npos=4 and when Npos=7. Pref (1)=4 is stored at the first occurrence of Ref input, and Pref (2)=7 is stored at the second occurrence of Ref input. Since Nref is counted up each time Ref input occurs, Nref=2 at the time of execution of cylinder discrimination processing (Npos=9).

In cylinder discrimination processing executed after determination of Pstd, the number of pulse dropouts (Nkake) corresponding to the present Pstd is obtained and set in steps S201, S202a, and S202b by the same method as that in Embodiment 1. In the example shown in FIG. 15, Tpos (Npos−1)/Tpos (Npos)≦k2 (=2.5) is established. Then, Nkake=1, and Nstd+1=0+1=1.

Next, in step S203, the number of Pstd detections Nstd is counted up. In step S204, a determination is made as to whether the present Pstd is the result of first-time detection after the startup.

When Nstd=1, and if the present Pstd is the result of first-time detection after the startup, a determination is made from Npos+Nkake in step S205 as to whether after the startup the rotation angle has become large enough to set a cylinder discrimination period. If Npos+Nkake≧9 and it is determined that a cylinder discrimination period can be set, a cylinder discrimination period is set between B35° CA and B75° CA (80° CA) in step S206a. On the other hand, if Npos+Nkake<9 and it is determined that the angle is not sufficiently large, a jump to step S211 is made and Npos, Nref, and Pref are cleared to set Npos=1, Nref=0, and Pref=0, thereby terminating the processing.

If Nstd>1, i.e., the present Pstd is the result of second-time or some other subsequent detection after the startup, a cylinder discrimination period is set between B75° CA and B75° CA (120° CA) in step S206b.

In the case shown in FIG. 15, Nstd=1 and it is determined that the present Pstd is the result of first-time detection after the startup. Then, from Npos+Nkake=9+1=10≧9, it is determined that a cylinder discrimination period can be set, and a cylinder discrimination period is set between B35° CA and B75° CA (80° CA) corresponding to Npos=2 to 9.

After a cylinder discrimination period has been set as described above, the number of Ref pulses (Nref2) in the cylinder discrimination period is first obtained from Nref and Pref (1) to Pref (Nref) in step S207. From Pref (1) to Pref (Nref), Nref2 can easily be obtained by subtraction from Nref if a Ref pulse out of the set cylinder discrimination period is included in the count.

If it is determined in step S208 that Nref2=1, the Ref signal position Pref (Nref) last detected in step S209 is stored as Pref2.

In the case shown in FIG. 15, Pref (1)=4 and Pref (2)=7, it is therefore determined that both the two Ref pulses are obtained in the cylinder discrimination period (Npos=2 to 9), and Nref2=Nref=2 is obtained. In this case, since Nref2 ≠1, processing relating to Pref2 is not executed.

Nkake, Nref2, and Pref2 are obtained by the above-mentioned processing to enable in step S210 cylinder identification by referring to FIG. 14. Finally, Npos, Nref and Pref are cleared to set Npos=1, Nref=0, and Pref=0, and the processing ends. In FIG. 15, the cylinder #4 at B75° CA can be identified from Nkake=1 and Nref=2 (Pref2 is not considered since Nref=2).

While an example of cylinder identification at Pstd=1 has been described with reference to FIG. 15, a situation where the Pos is detected, for example, from the B05° CA position shown in FIG. 15 should be considered, although the frequency of its occurrence is low. In this case, Npos+Nkake<9 at the time point corresponding to Pstd=1 and the angular value large enough to set a cylinder discrimination period is not reached. In this case, as is also apparent from the flowcharts shown in FIGS. 7, 8, and 16, cylinder discrimination is performed at Pstd=2. As described above, cylinder discrimination is performed only after a reliable result of detection of Ref has been obtained, thus preventing misidentification of each cylinder.

Embodiment 3

A cylinder identifying apparatus for an internal combustion engine which represents Embodiment 3 of the present invention will be described with reference to the accompanying drawings.

Figure 17:
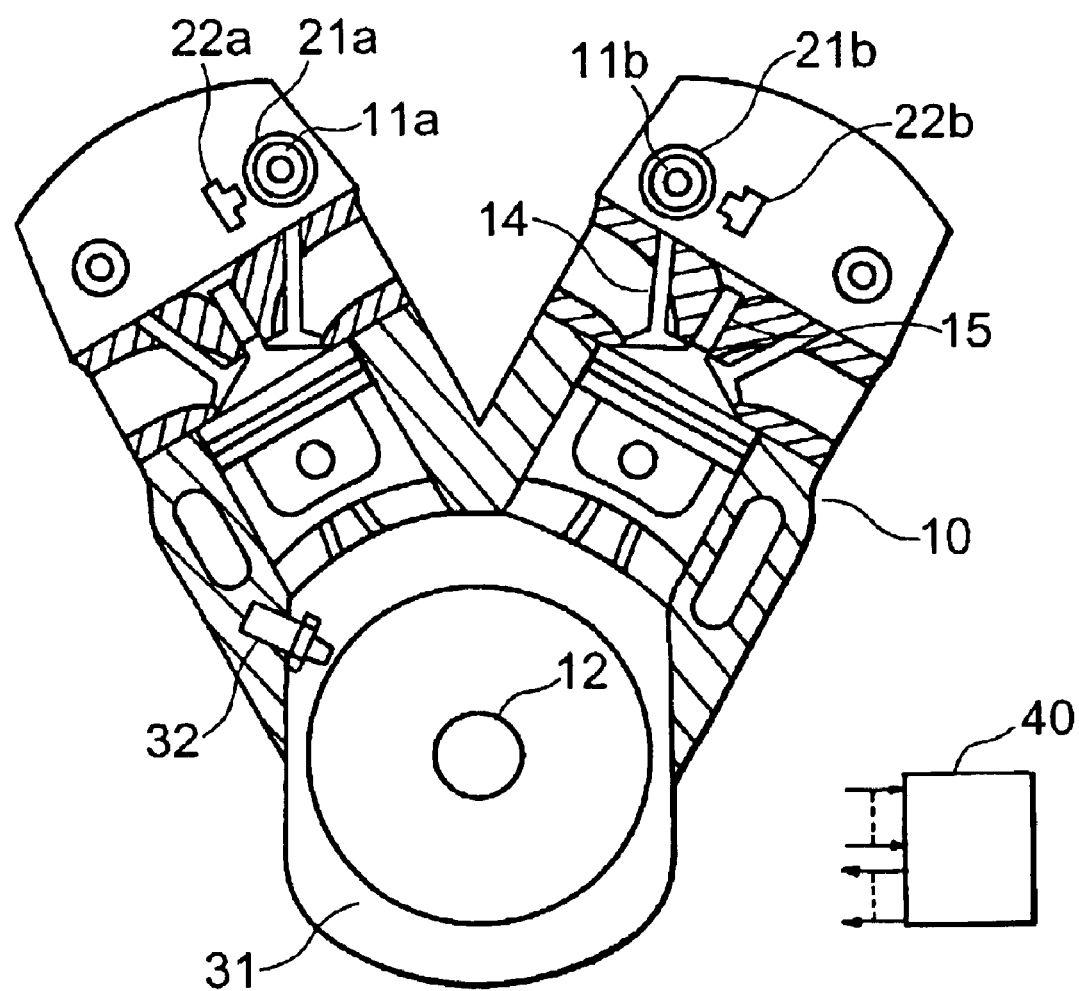
FIG. 17 is a diagram schematically showing the structure of a V6-cylinder internal combustion engine relating to Embodiment 3 of the present invention.
Figure 18:
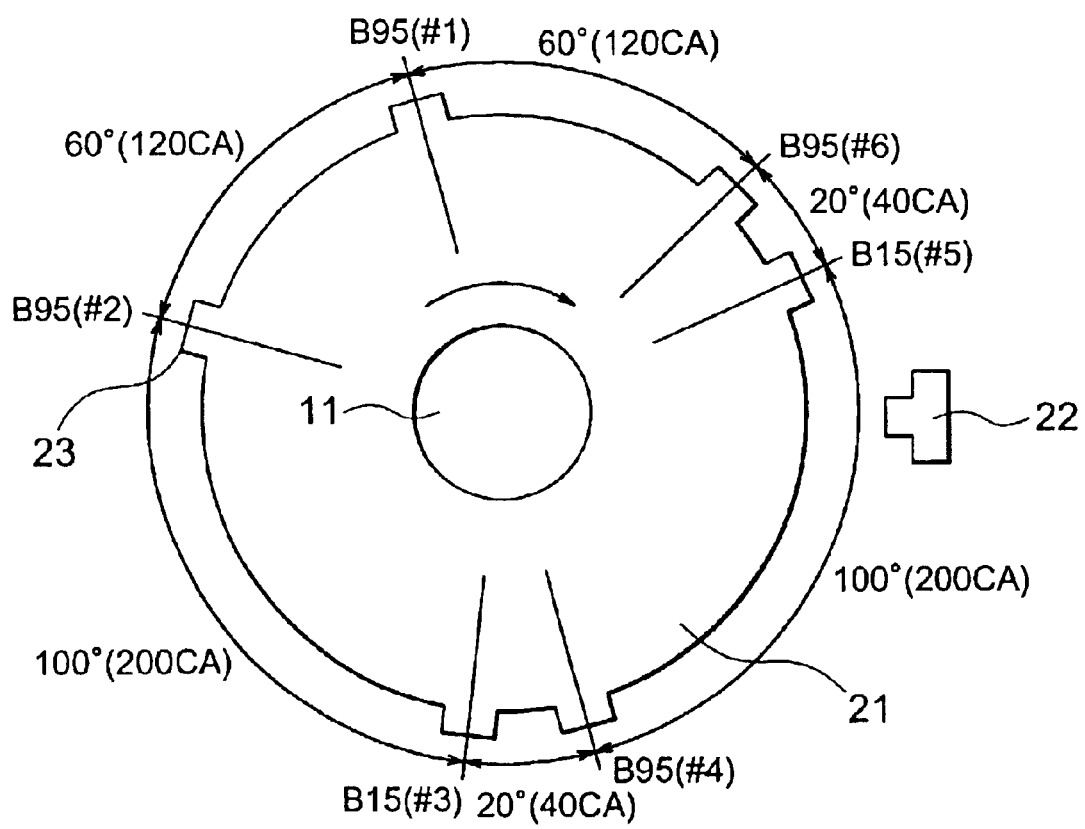
FIG. 18 is a diagram showing a concrete example of a configuration of a signal plate in cylinder discrimination signal generation means in Embodiment 3 of the present invention.

FIG. 17 is a diagram showing the structure of a V6-cylinder internal combustion engine having a VVT according to Embodiment 3 of the present invention. FIG. 18 is a diagram showing a concrete example of a configuration of signal plates 21a and 21b in cylinder discrimination signal generation means. Also, a concrete configuration of a signal plate in crank angle position signal generation means is the same as that of Embodiment 2 described above.

In FIG. 17 are illustrated an internal combustion engine 10, a camshaft 11a, 11b, a crankshaft 12, valves 14, and an ignition plug 15. Signal plate 21a, 21b and sensor 22a, 22b constitute cylinder discrimination signal generation means. A signal plate 31 and a sensor 32 constitute crank angle position signal generation means. A control unit 40 is provided which includes a central processing unit (CPU) and a memory, and to which the sensor 22a, 22b and the sensor 32 are connected.

In FIG. 18 are illustrated the camshaft 11, the signal plate 21 of the cylinder discrimination signal generation means, the sensor 22, and projections 23. The signal plate 21 and the sensor 22 constitute cylinder discrimination signal generation means.

In Embodiment 3, the two signal plates 21a and 21b provided in the cylinder discrimination signal generation means are identical in configuration to each other, as shown in FIG. 18, but they are mounted with a phase difference of 180° from each other to enable signals from the signal plates 21a and 21b to be discriminated from each other. Needless to say, these signal plates may be made different in configuration from each other.

Figure 19:
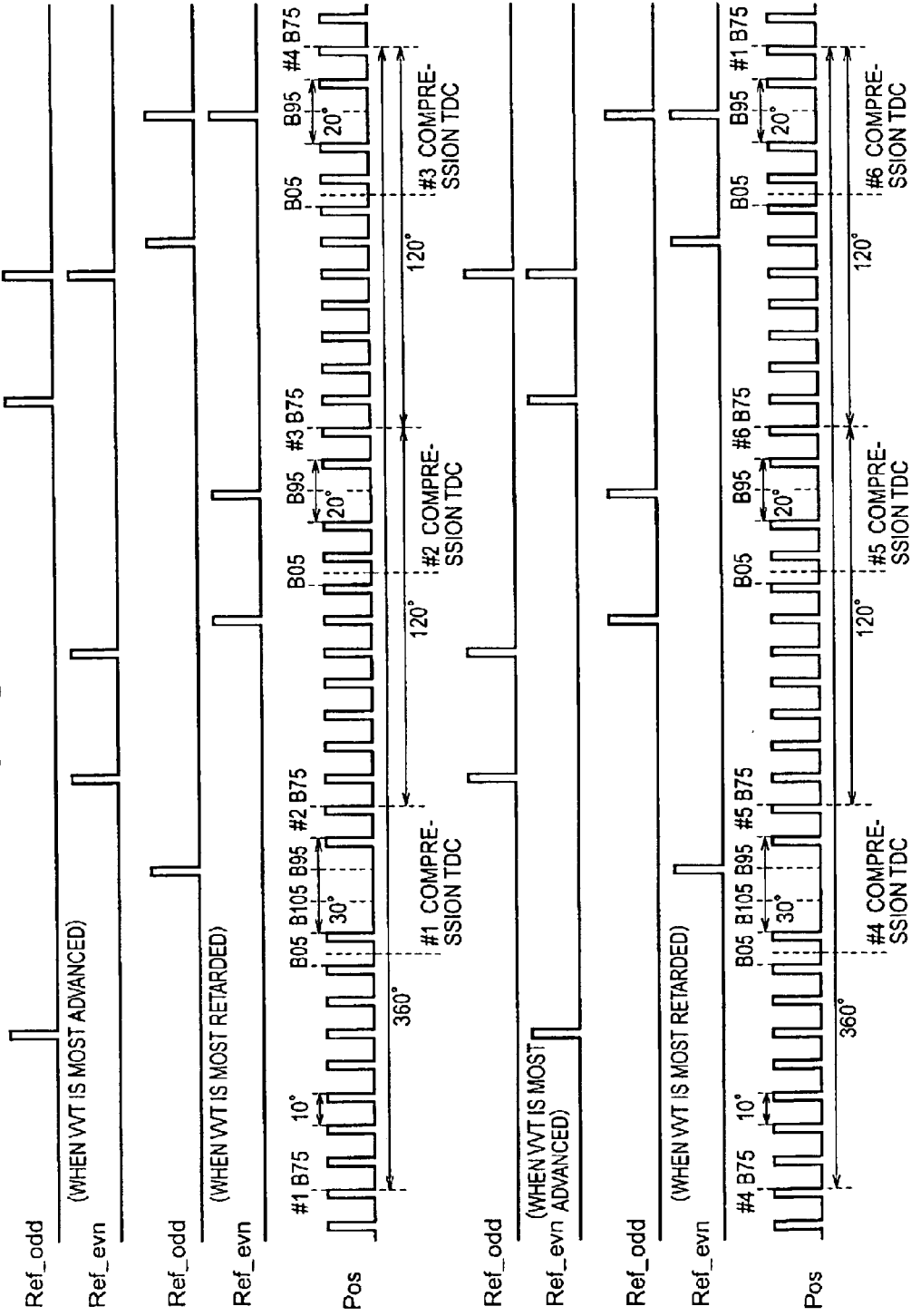
FIG. 19 is a timing chart showing the pulse waveforms of cylinder discrimination signals Ref_odd and Ref_evn and crank angle position signal Pos in Embodiment 3 of the present invention.

FIG. 19 shows an example of patterns of an odd-number-bank-side cylinder discrimination signal Ref_odd from the sensor 22a placed on the camshaft 11a, an even-number-bank-side cylinder discrimination signal Ref_evn from the sensor 22b placed on the camshaft 11b, and crank angle position signal Pos. As patterns of each cylinder discrimination signal, both a pattern when the VVT is most advanced (to 50° CA (crank angle)) and a pattern when the VVT is most retarded are shown. Each of cylinder discrimination signals Ref_odd and Ref_evn and crank angle position signal Pos is generated by the same method as that in Embodiment 1 described above.

Crank angle position signal Pos and cylinder discrimination period are generated by the same method as those in Embodiment 2 described above.

By considering the phase differences between the crankshaft 12 and the camshafts 11*a* and 11*b*, including the differences during VVT operation, and the reduction in cylinder discrimination period at the time of startup, each cylinder discrimination signal Ref is placed so that a predetermined number of pulses of the cylinder discrimination signal Ref are output in a cylinder discrimination period. Each Ref signal is placed at such positions that if one or more Ref pulses are set in a cylinder discrimination period, at least one Ref pulse can be detected even when the VVT is most advanced.

In FIG. 19, cylinder discrimination signal Ref is placed as described below.

Between #1 B35° CA and #2 B75° CA: Nref2_odd)=1, Nref2_evn=0,
Between #2 B35° CA and #3 B75° CA: Nref2_odd)=0, Nref2_evn=2,
Between #3 B35° CA and #4 B75° CA: Nref2_odd)=2, Nref2_evn=1,
Between #4 B35° CA and #5 B75° CA: Nref2_odd)=0, Nref2_evn=1,
Between #5 B35° CA and #6 B75° CA: Nref2_odd)=2, Nref2_evn=0, and
Between #6 B35° CA and #1 B75° CA: Nref2_odd)=1, Nref2_evn=2.

As described above, with respect to each reference crank angle position Pstd determined when a cylinder discrimination period is set, the corresponding cylinder can be identified when the VVT is most retarded from the combination of the reference crank angle position Pstd determined in terms of the number of pulse dropouts (Nkake), the number of cylinder discrimination signal Ref pulses (Nref2_odd) in an odd-number bank side cylinder discrimination period, and the number of cylinder discrimination signal Ref pulses (Nref2_evn) in an even-number bank side cylinder discrimination period as shown in FIG. 20.

Also, if Nref2_odd and Nref2_evn have at least one Ref pulse as shown in FIG. 20, at least one Ref pulse exists when the VVT is most advanced. In this case, there is a possibility of #1 and #4 being unable to be discriminated from each other only in the first cylinder discrimination period after the startup. To enable them to be discriminated from each other, the combination of Nref2_odd or Nref2_evn may be selected so as to set 0 for one of the two cylinders. However, since the Ref signals are also used for VVT control for example, there is a possibility of deterioration in controllability unless Ref pulses are set for both the two banks. Also, the frequency of an operation to maximize the VVT angular advance at the time of startup is low, and the other four cylinders can be discriminated from each other. Therefore this embodiment is advantageous. Needless to say, each cylinder can be discriminated from the others in the second and other subsequent cylinder discrimination periods irrespective of the VVT operation.

In FIG. 20, the numerals in [ ] in the sections for Nref2_odd and Nref2_evn indicate the numbers of Ref pulses in the first cylinder discrimination period after startup in the case where the VVT is most advanced.

Figure 21:
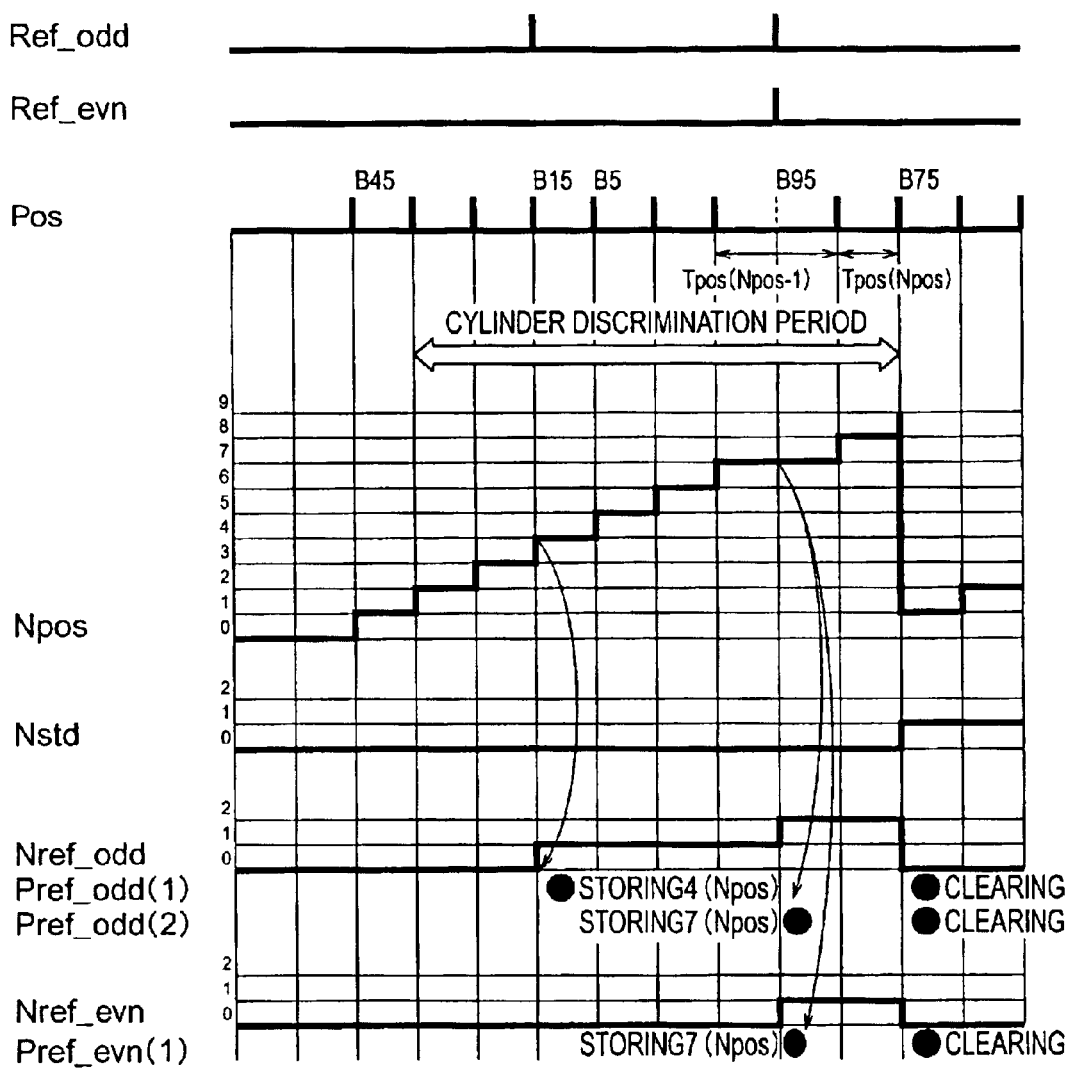
FIG. 21 is a timing chart showing the pulse waveforms of Ref_odd, Ref_evn, and Pos and control variables Npos, Nstd, Nref_odd, Pref_odd, Nref_evn, Pref_evn, and Tpos in startup cylinder discrimination operation from B45° CA in Embodiment 3 of the present invention.
Figure 22:
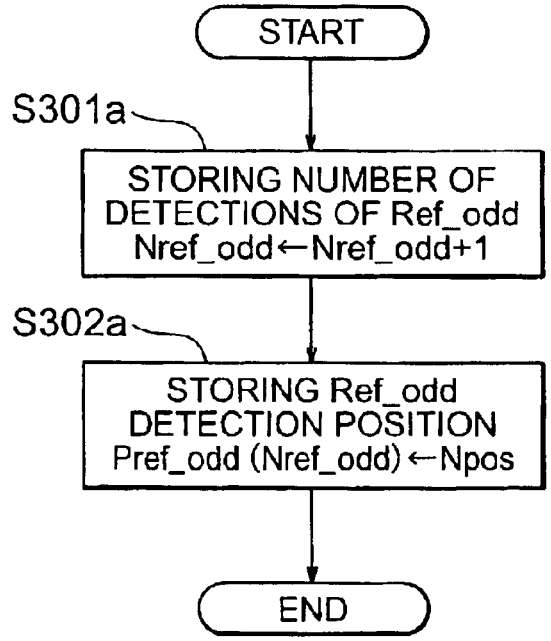
FIG. 22 is a flowchart showing steps of processing at the time of Ref_odd input in Embodiment 3 of the present invention.
Figure 23:
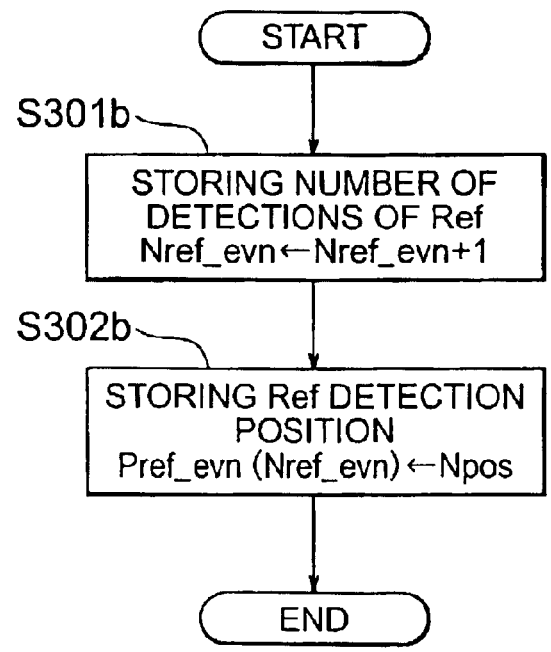
FIG. 23 is a flowchart showing steps of processing at the time of Ref_evn input in Embodiment 3 of the present invention.
Figure 24:
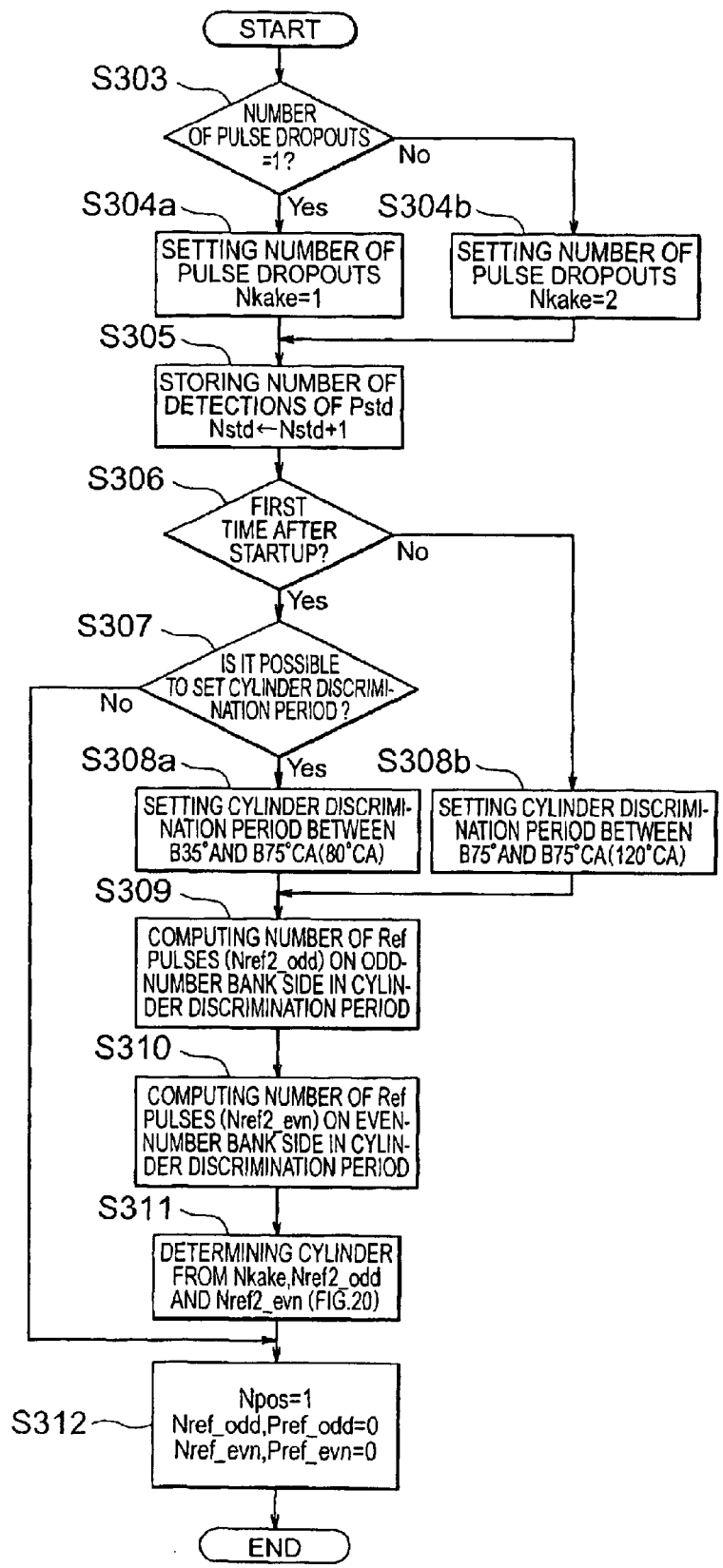
FIG. 24 is a flowchart showing steps of cylinder discrimination processing in Embodiment 3 of the present invention.

FIG. 21 a diagram showing an example of a method of identifying cylinders at the time of startup in a case where the crank angle signal is detected immediately before B45 in the vicinity of the ordinary engine stop angle in the six-cylinder engine (when the VVT is most retarded). Also, processing at the time of Pos input in the control unit 40 is the same as that in Embodiment 1 described above. FIG. 22 shows processing at the time of Ref_odd input in the control unit 40. FIG. 23 shows processing at the time of Ref_evn input in the control unit 40. FIG. 24 shows cylinder discrimination processing in step S106 executed after Pstd determination in step S105 in processing at the time of Pos input. Variables Npos, Nref_odd, Nref_evn, and Nstd used in the above-mentioned processings are cleared to 0 before startup of the engine.

At the time of Pos input, reference crank position Pstd is determined by the same method as that in Embodiment 1 described above. Cylinder discrimination processing described below is executed at the time of Pstd determination. In the case shown in FIG. 21, Tpos (Npos−1)/Tpos (Npos)>k1 is established at the time of the ninth Pos input (Npos=9), reference crank position Pstd is thereby determined, and cylinder discrimination processing is then executed.

At the time of Ref_odd input, the number Nref_odd of detections of Ref_odd is counted up in step S301*a* and the Npos at the corresponding time is stored as Pref_odd (Nref_odd) in step S302*a*. Pos at the time of Ref_odd detection is thereby made definite to enable computation of the number of Ref_odd pulses (Nref2_odd) in a cylinder discrimination period described below. Similar processing is performed in steps S301*b* and S302*b* shown in FIG. 23.

In the case shown in FIG. 21, Ref_odd input occurs when Npos=4 and when Npos=7. Pref_odd (1)=4 is stored at the first occurrence of Pref_odd input, and Pref_odd (2)=7 is stored at the second occurrence of Pref_odd input. Since Nref_odd is counted up each time Ref_odd input occurs, Nref_odd=2 at the time of execution of cylinder discrimination processing (Npos=9). Similarly, Ref_evn input occurs when Npos=7, whereby Pref_evn (1)=7, and Nerf_evn=1.

In cylinder discrimination processing executed after determination of Pstd, the number of pulse dropouts (Nkake) corresponding to the present Pstd is determined in step S303 of FIG. 24 and Nkake is set in steps S304*a* and S304*b* by the same method as that in Embodiment 1. In FIG. 21, Tpos (Npos−1)/Tpos (Npos)≦k2 (=2.5) is established. Then, Nkake=1.

Next, in step S305, the number of Pstd detections Nstd is counted up. In step S306, a determination is made as to whether the present Pstd is the result of first-time detection after the startup.

When Nstd=1, and if the present Pstd is the result of first-time detection after the startup, a determination is made from Npos+Nkake in step S307 as to whether after the startup the rotation angle has become large enough to set a cylinder discrimination period. If Npos+Nkake≧9 and it is determined that a cylinder discrimination period can be set, a cylinder discrimination period is set between B35° CA and B75° CA (80° CA) in step S308*a*. On the other hand, if Npos+Nkake<9 and it is determined that the angle is not sufficiently large, a jump to step S312 is made and Npos, Nref_odd, Pref_odd, Nref_evn, and Pref_evn are cleared to set Npos=1, Nref_odd=0, Pref_odd=0, Nref_evn=0, and Pref_evn=0, thereby terminating the processing.

If Nstd>1, i.e., the present Pstd is the result of second-time or some other subsequent detection after the startup, a cylinder discrimination period is set between B75° CA and B75° CA (120° CA) in step S308*b*.

In FIG. 21, Nstd=Nstd+1=0+1=1 and it is determined that the present Pstd is the result of first-time detection after the startup. Then, from Npos+Nkake=9+1=10≧9, it is determined that a cylinder discrimination period can be set, and a cylinder discrimination period is set between B35° CA and B75° CA (80° CA) corresponding to Npos=2 to 9.

After a cylinder discrimination period has been set, the number of Ref pulses (Nref2_odd) in the odd-number bank side cylinder discrimination period is first obtained from Nref_odd and Pref_odd (1) to Pref_odd (Nref_odd) in step S309. From Pref_odd (1) to Pref_odd (Nref_odd), Nref2_odd can easily be obtained by subtraction from Nref_odd if a Ref_odd pulse out of the set cylinder discrimination period is included in the count. Similarly, the number of Ref pulses (Nref2_evn) in the even-number bank side cylinder discrimination period is obtained in step S310.

In the case shown in FIG. 21, Pref_odd (1)=4 and Pref_odd (2)=7, it is therefore determined that both the two Ref_odd pulses have been obtained in the cylinder discrimination period (Npos=2 to 9), and Nref2_odd=Nref_odd=2 is obtained. As for Ref_evn, Pref_evn (1)=7, so that Nref2_evn=Nref_evn=1 is obtained.

Nkake, Nref2_odd and Nref_evn are obtained by the above-mentioned processing, and one of the cylinders is identified in step S311 by referring to FIG. 20. As mentioned above, cylinder discrimination is not performed only when Nkake=1, Nref2_odd=1 and Nref2_evn=1, and cylinder discrimination is performed at the next Pstd. In the case shown in FIG. 21, the cylinder #4 at B75° CA can be identified from Nkake=1, Nref2_odd=2 and Nref2_evn=1. Finally, the variables are cleared to set Npos=1, Nref_odd=0, Pref_odd=0, Nref_evn=0, and Pref_evn=0, thereby terminating the processing.

While an example of cylinder identification at Pstd=1 when the VVT is most retarded has been described with reference to FIG. 21, a situation where the Pos is detected, for example, from the B05° CA position shown in FIG. 21 should be considered, although the frequency of its occurrence is low. In this case, Npos+Nkake<9 at the time point corresponding to Pstd=1 and the angular value large enough to set a cylinder discrimination period is not reached. In this case, as is also apparent from the flowcharts shown in FIGS. 7 and 22 to 24, cylinder discrimination is performed at Pstd=2. As described above, cylinder discrimination is performed only after a reliable result of detection of Ref has been obtained, thus preventing misidentification of each cylinder.

Embodiment 4

A cylinder identifying apparatus for an internal combustion engine which represents Embodiment 4 of the present invention will be described with reference to the accompanying drawings.

Figure 25:
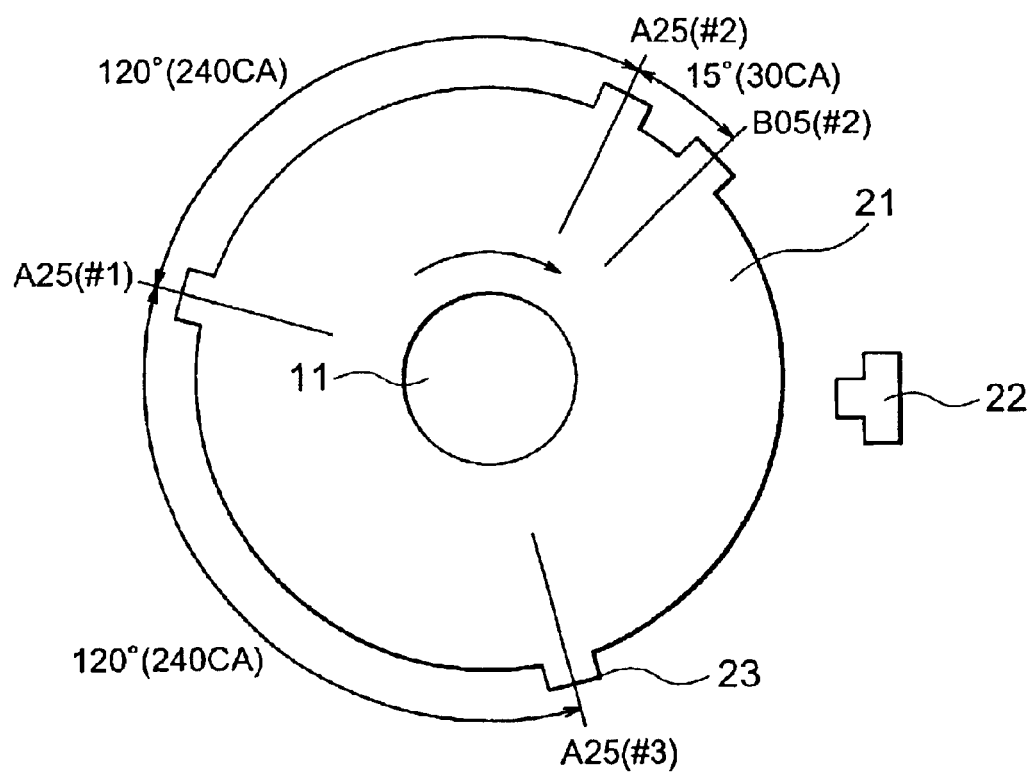
FIG. 25 is a diagram showing a concrete example of a configuration of a signal plate in cylinder discrimination signal generation means in Embodiment 4 of the present invention.

Although Embodiment 4 employs the same configuration as that of Embodiment 1 described above, there is employed a three-cylinder internal combustion engine having a VVT. A concrete configuration of a signal plate in crank angle position signal generation means is the same as that of Embodiment 2 described above. FIG. 25 is a diagram showing a concrete example of a configuration of a signal plate in cylinder discrimination signal generation means.

In FIG. 25 are illustrated the camshaft 11, the signal plate 21 of the cylinder discrimination signal generation means, the sensor 22, and projections 23. The signal plate 21 and the sensor 22 constitute cylinder discrimination signal generation means.

Figure 26:
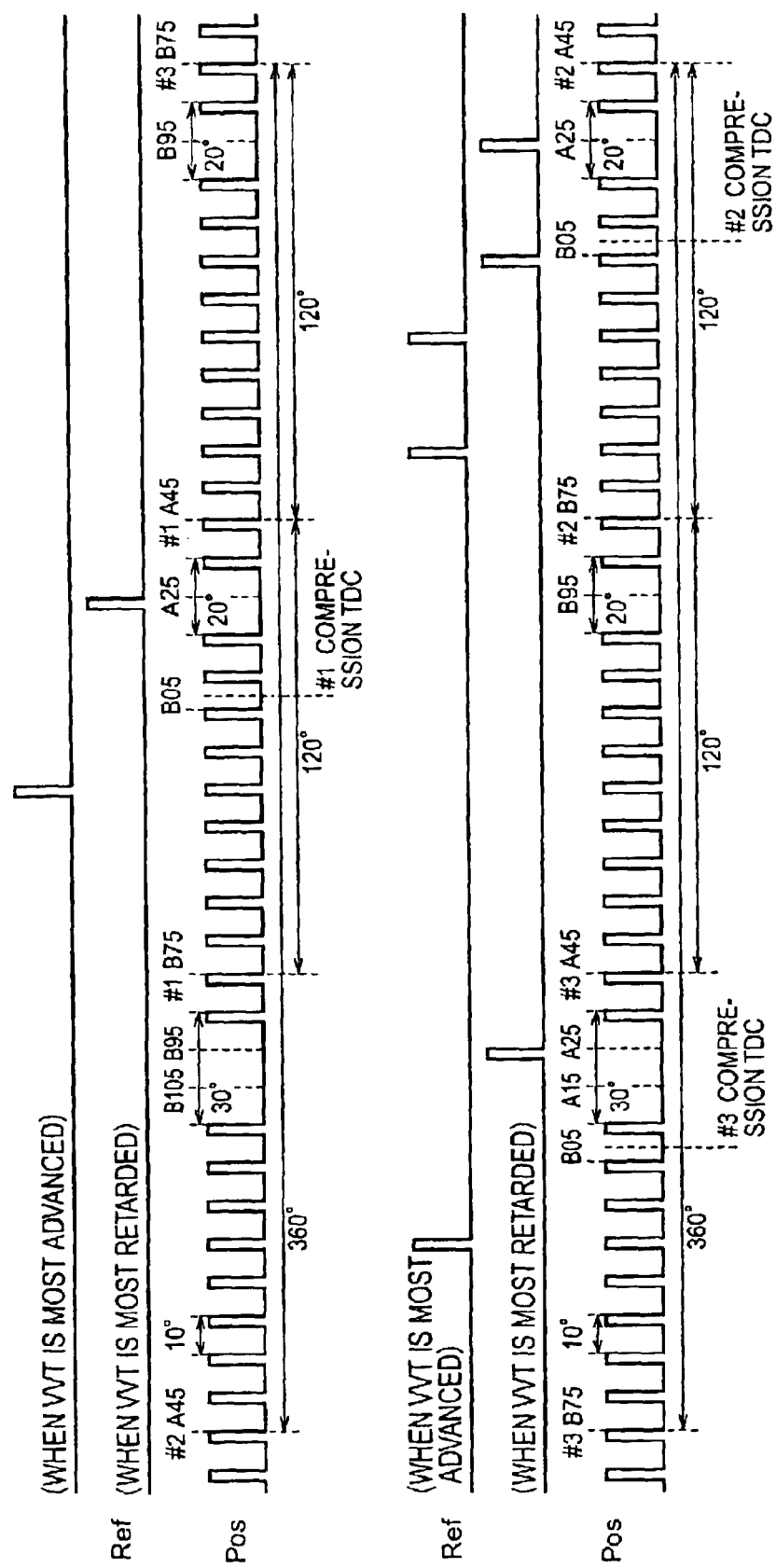
FIG. 26 is a timing chart showing the pulse waveforms of cylinder discrimination signal Ref and crank angle position signal Pos in Embodiment 4 of the present invention.

FIG. 26 shows patterns of cylinder discrimination signal Ref and crank angle position signal Pos. As patterns of cylinder discrimination signal Ref, both a pattern when the VVT is most advanced (to 50° CA (crank angle)) and a pattern when the VVT is most retarded are shown.

The configuration of the signal plate 31 of the crank angle position signal generation means is the same as that in Embodiment 2 described above. However, since the engine is a three-cylinder internal combustion engine, one-pulse dropout portion 31b is set at a A25° CA (B95° CA) position, and two-pulse dropout portion 31c is set at a A25° CA (B95° CA) position and at a A15° CA (B105° CA) position. From these tooth vacancies, a A45° CA (B75° CA) position is determined as a reference crank angle position Pstd.

The Pstd at each of the A45° CA and B75° CA positions of each cylinder is determined. However, if cylinder discrimination is performed by using all the positions Pstd, there is apprehension that a complicated discriminant signal and a complicated discriminant algorithm may be required. Therefore an arrangement is adopted in which a selection is made from the reference crank positions Pstd according to the existence/nonexistence of detected cylinder discrimination signal Ref described below to set the A45° CA position as reference crank angle position Pstd_sel, thereby enabling use of a simpler discriminant signal and algorithm.

A total of three selected reference crank angle positions Pstd_sel are determined from the number of pulse dropouts (Nkake), as shown below.
Pstd_sel corresponding to #1 and #2: Nkake=1
Pstd_sel corresponding to #3: Nkake=2

A cylinder discrimination period is set between B75° CA and A45° CA (120° CA) with reference to the selected reference crank angle positions Pstd_sel on the basis of the numbers of detections of crank angle position signal Pos or the results of detection of reference crank angle positions.

By considering the phase differences between the crankshaft 12 and the camshaft 11, including the differences during VVT operation, and the reduction in cylinder discrimination period at the time of startup, each cylinder discrimination signal Ref is placed so that a predetermined number of pulses of the cylinder discrimination signal Ref are output in a cylinder discrimination period. For the selection of Pstd_sel, Ref signal is not placed at such positions between Pstd that are not cylinder discrimination period (Between #1 A45° CA and #3 B75° CA, between #3 A45° CA and #2 B75° CA, or between #2 A45° CA and #1 B75° CA).

In FIG. 26, cylinder discrimination signal Ref is placed as described below.
Between #1 B75° CA and #1 A45° CA: Nref2=1,
Between #3 B75° CA and #3 A45° CA: Nref2=1, and
Between #2 B75° CA and #2 A45° CA: Nref2=2.

As described above, with respect to each reference crank angle position Pstd_sel determined when a cylinder discrimination period is set, the corresponding cylinder can be identified from the combination of the selected reference crank angle position Pstd_sel determined in terms of the number of pulse dropouts (Nkake) and the number of cylinder discrimination signal Ref pulses (Nref2) in a cylinder discrimination period as shown in FIG. 27.

Figure 28:
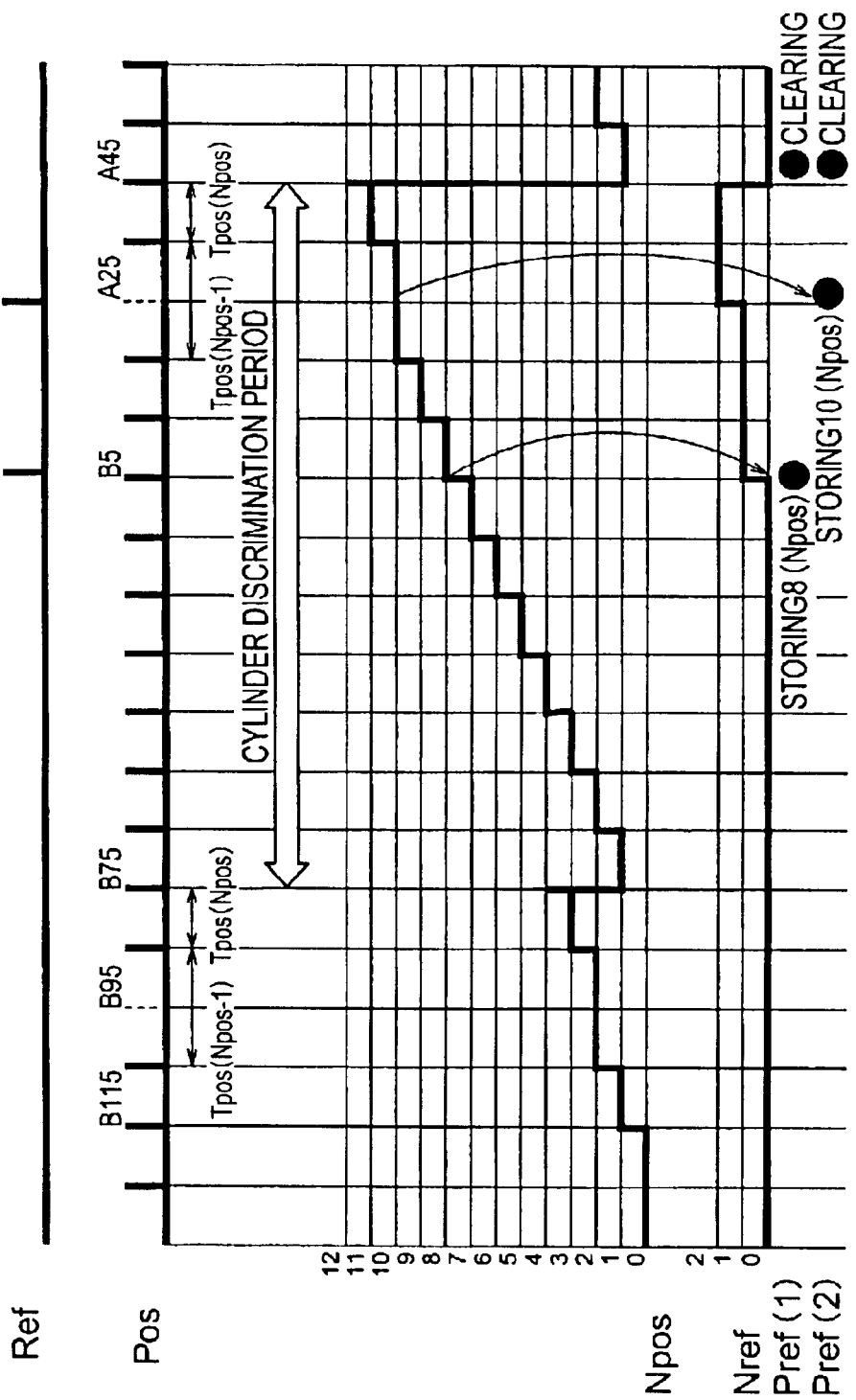
FIG. 28 is a timing chart showing the pulse waveforms of Ref and Pos and control variables Npos, Nref, Pref, and Tpos in startup cylinder discrimination operation from B115° CA in Embodiment 4 of the present invention.

FIG. 28 is a diagram showing an example of a method of identifying cylinders at the time of startup in a case where the crank angle signal is detected immediately before B115 in the vicinity of the ordinary engine stop angle in the three-cylinder engine (when the VVT is most retarded).

Processing at the time of Pos input and processing at the time of Ref input are performed in the same manner as those in Embodiment 1 described above. Only cylinder discrimination processing executed after Pstd determination in processing at the time of Pos input differs from that described above and is therefore shown in FIG. 29. Variables Npos, Nref, and Nstd used in the above-mentioned processings are cleared to 0 before startup of the engine.

At the time of Pos input, reference crank position Pstd is determined by the same method as that in Embodiment 1 described above. Cylinder discrimination processing described below is executed at the time of Pstd determination. In FIG. 28, Tpos (Npos−1)/Tpos (Npos)>k1 (=1.5) shown in Embodiment 1 is established at the time of the fourth Pos input (Npos=4) and the fifteenth Pos input (Npos=12), reference crank position Pstd is thereby determined, and cylinder discrimination processing is then executed.

Also at the time of Ref input, Npos and Pref (Nref) are obtained by the same method as that in Embodiment 1 described above. In the case shown in FIG. 28, Nref and Pref are once cleared when first-time execution of cylinder discrimination processing (Npos=4). Thereafter, Ref input occurs when Npos=8 and when Npos=10. Pref (1)=8 is stored at the first occurrence of Ref input, and Pref (2)=10 is stored at the second occurrence of Ref input. Since Nref is counted up each time Ref input occurs, Nref=2 at the time of second-time execution of cylinder discrimination processing (Npos=12).

Figure 29:
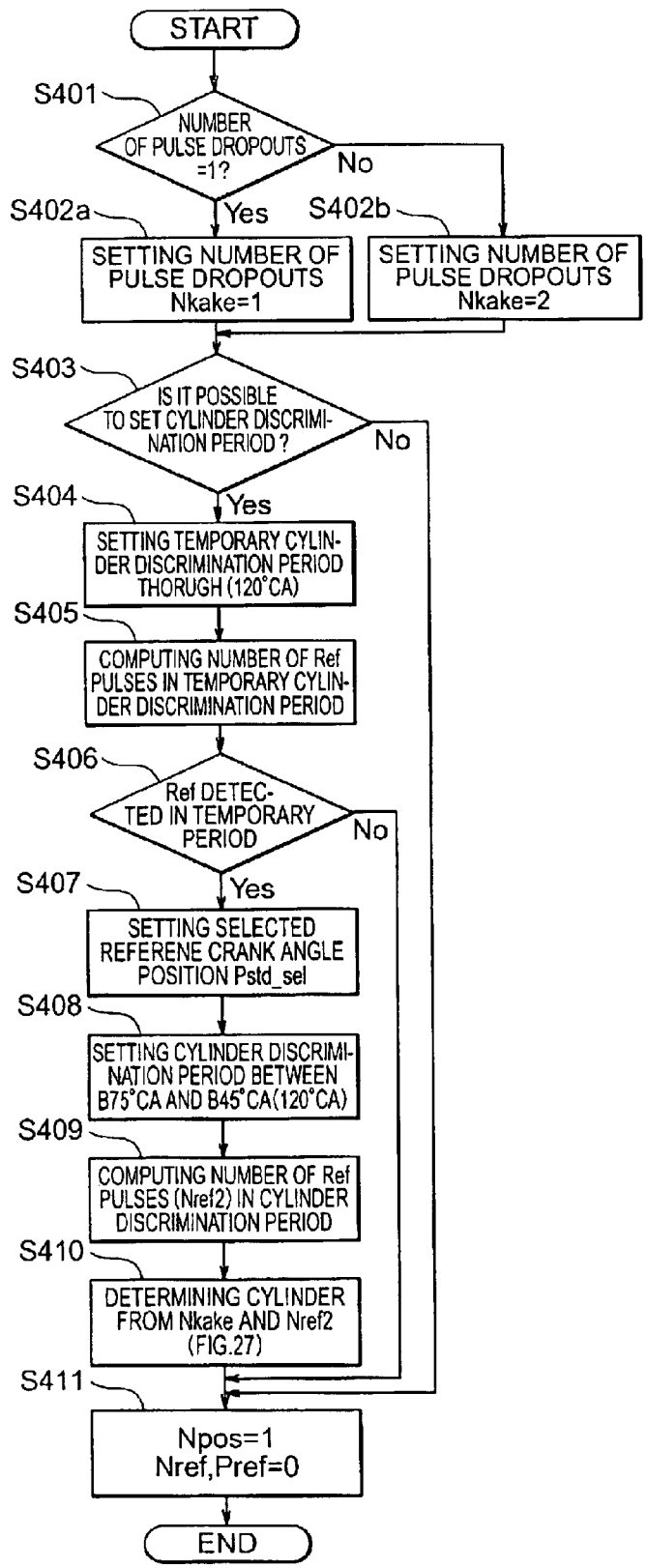
FIG. 29 is a flowchart showing steps of cylinder discrimination processing in Embodiment 4 of the present invention.

In cylinder discrimination processing executed after determination of Pstd, the number of pulse dropouts (Nkake) corresponding to the present Pstd is determined in step S401 of FIG. 29 and Nkake is set in steps S402a and S402b by the same method as that in Embodiment 1. In FIG. 28, Tpos (Npos−1)/Tpos (Npos)≦k2 (=2.5) is established both in the first and second times. Then, Nkake=1.

A determination is made from Npos+Nkake in step S403 in the same manner as in Embodiment 1 as to whether after the startup the rotation angle has become large enough to set a cylinder discrimination period. If Npos+Nkake≧13 and it is determined that a temporary cylinder discrimination period can be set, a temporary cylinder discrimination period is set between 120° CA in step S404. If Npos+Nkake<13 and it is determined that the angle is not sufficiently large, a jump to step S411 is made and Npos, Nref, and Pref are cleared to set Npos=1, Nref=0, and Pref=0, thereby terminating the processing.

In the case shown in FIG. 28, Npos+Nkake=4+1=5<13 at the time of first-time determination of Pstd, it is therefore determined that a temporary cylinder discrimination period cannot be set, Npos, Nref and Pref are then cleared, and the processing ends. Npos+Nkake=12+1=13 ≧13 at the second-time determination of Pstd, it is therefore determined that a temporary cylinder discrimination period can be set, and a temporary cylinder discrimination period is set through 120° CA corresponding to Npos=1 to 12.

If a temporary cylinder discrimination period is set by the above-mentioned processing, the number of Ref pulses in the temporary cylinder discrimination period is computed from Nref and Pref (1) to Pref (Nref) in step S405, and the existence/nonexistence of a detected Ref pulse is checked in step S406. If it is determined that no Ref pulse has been detected, Npos, Nref and Pref are cleared to set Npos=1, Nref=1, and Pref=0, thereby terminating the processing. On the other hand, if a Ref pulse has been detected, the present Pstd is set as Pstd_sel in step S407 to permit cylinder discrimination.

After Pstd_sel has been set, setting of a cylinder discrimination period can be made. A cylinder discrimination period is set between B75° CA and A45° CA (120° CA) in step S408, and Nref2 is obtained in step S409. In the case shown in FIG. 28, since Pref (1)=8 and Pref (2)=10, it is determined that both the two detected Ref pulses are obtained in the temporary cylinder discrimination period (Npos=1 to 12), cylinder discrimination is then permitted, and the present Pstd is selected as Pstd_sel. As a result, both Pref (1)=8 and Pref (2)=10 exist in the cylinder discrimination period (Npos=1 to 12), and Nref2=Nref=2 is obtained.

Nkake and Nref2 are obtained by the above-mentioned processing, and one of the cylinders is identified in step S410 by referring to FIG. 27. In FIG. 28, the cylinder #2 at A45° CA can be identified from Nkake=1 and Nref2=2. Finally, the variables are cleared to set Npos=1, Nref=0, and Pref=0, thereby terminating the processing.

In the above-mentioned Embodiments 1 to 4, pulse dropouts are used as reference crank positions. However, a signal may be separately provided instead of the pulse dropouts. Also, while the crank angle position signal Pos corresponding to 10° CA has been described with respect the angle in each of the above-mentioned embodiments, an angular step freely selected, e.g., 5° CA may alternatively by set. While the processings for the three-cylinder, four-cylinder and six-cylinder internal combustion engines have been described, the present invention can also be applied to internal combustion engines having other numbers of cylinders.

What is claimed is:

1. A cylinder identifying apparatus for an internal combustion engine, comprising:

cylinder discrimination signal generation means for generating a cylinder discrimination signal in correspondence with each of cylinders of the internal combustion engine according to the rotation of a camshaft of the internal combustion engine;

crank angle position signal generation means including a member rotating through two revolutions when the camshaft rotates through one revolution, said crank angle position signal generation means for generating a crank angle position signal including pulse dropout portions corresponding to each of the cylinders of the internal combustion engine in accordance with the rotation angle of a crankshaft of the internal combustion engine; and a control unit for detecting the crank angle position signal to obtain the number of detections of the crank angle position signal; detecting a reference crank position on the basis of one of the pulse dropout portions of the crank angle position signal; detecting the cylinder discrimination signal to obtain the number of detections of the cylinder discrimination signal; obtaining the number of detections of the crank angle position signal when the cylinder discrimination signal is detected; obtaining the number of pulse dropouts on the basis of one of the pulse dropout portions of the crank angle position signal; obtaining the number of detections of the reference crank position; setting a first cylinder discrimination period with reference to the reference crank position when said control unit determines that the present reference crank position is the result of first-time detection after startup on the basis of the number of detections of the reference crank position; setting a second cylinder discrimination period different from the first cylinder discrimination period with reference to the reference crank position when said control unit determines that the present reference crank position is the result of second-time or some other subsequent detection after the startup; obtaining the number of detections of the cylinder discrimination signal in the first or second cylinder discrimination period on the basis of the number of detections of the cylinder discrimination signal and the number of detections of the crank angle position signal at the time of detection of the cylinder discrimination signal; and identifying one of the cylinders on the basis of the number of pulse dropouts and the number of detections of the cylinder discrimination signal in the first or second cylinder discrimination period.

2. A cylinder identifying apparatus for an internal combustion engine according to claim 1, wherein if the present reference crank position is the result of first-time detection after startup, and if an angle for enabling setting of a cylinder discrimination period after startup is obtained on the basis of the sum of the number detections of the crank angle position signal and the number of pulse dropouts, said control unit sets the first cylinder discrimination period shorter than the second cylinder discrimination period.

3. A cylinder identifying apparatus for an internal combustion engine according to claim 2, wherein said control unit sets the first cylinder discrimination period in the vicinity of an engine stop position on the retardation side.

4. A cylinder identifying apparatus for an internal combustion engine according to claim 3, wherein the internal combustion engine is a 4-cylinder engine having a variable valve timing mechanism; the first cylinder discrimination period corresponds to an angle of about 140 degrees from an angle of about 35 degrees before the compression top dead center of one of the cylinders to an angle of about 75 degrees before the compression top dead center of the next cylinder; and the second cylinder discrimination period corresponds to an angle of about 180 degrees from an angle of about 75 degrees before the compression top dead center of one of the cylinders to an angle of about 75 degrees before the compression top dead center of the next cylinder.

5. A cylinder identifying apparatus for an internal combustion engine according to claim 2, wherein said control unit sets the first cylinder discrimination period in the vicinity of an engine stop position, obtains the number of detections of the crank angle position signal at the time of the last detection of the cylinder discrimination signal when the number of detections of the cylinder discrimination signal in the first or second cylinder discrimination period is 1, and identifies one of the cylinders on the basis of the number of detections of the crank angle position signal at the time of the last detection of the cylinder discrimination signal as well as the number of pulse dropouts and the number of detections of the cylinder discrimination signal in the first or second cylinder discrimination period.

6. A cylinder identifying apparatus for an internal combustion engine according to claim 5, wherein the internal combustion engine is a 6-cylinder engine; the first cylinder discrimination period corresponds to an angle of about 80 degrees from an angle of about 35 degrees before the compression top dead center of one of the cylinders to an angle of about 75 degrees before the compression top dead center of the next cylinder; and the second cylinder discrimination period corresponds to an angle of about 120 degrees from an angle of about 75 degrees before the compression top dead center of one of the cylinders to an angle of about 75 degrees before the compression top dead center of the next cylinder.

7. A cylinder identifying apparatus for an internal combustion engine according to claim 2, wherein said control unit sets the first cylinder discrimination period in the vicinity of an engine stop position on the retardation side, detects first and second cylinder discrimination signals from first and second cylinder discrimination signal generation means provided on first and second banks of the internal combustion engine to obtain the numbers of detections of the first and second cylinder discrimination signals, obtains the numbers of detections of the crank angle position signal at the times of detection of the first and second cylinder identification signals, obtains the numbers of detections of the first and second cylinder discrimination signals in the first or second cylinder discrimination period on the basis of the numbers of detections of the first and second cylinder discrimination signals and the numbers of detections of the crank angle position signal at the times of detection of the first and second cylinder identification signals, and identifies one of the cylinders on the basis of the number of pulse dropouts and the numbers of detections of the first and second cylinder discrimination signals in the first or second cylinder discrimination period.

8. A cylinder identifying apparatus for an internal combustion engine according to claim 7, wherein the internal combustion engine is a V6-cylinder engine having a variable valve timing mechanism; the first cylinder discrimination period corresponds to an angle of about 80 degrees from an angle of about 35 degrees before the compression top dead center of one of the cylinders to an angle of about 75 degrees before the compression top dead center of the next cylinder; and the second cylinder discrimination period corresponds to an angle of about 120 degrees from an angle of about 75 degrees before the compression top dead center of one of the cylinders to an angle of about 75 degrees before the compression top dead center of the next cylinder.

9. A cylinder identifying apparatus for an internal combustion engine, comprising:

cylinder discrimination signal generation means for generating a cylinder discrimination signal in correspondence with each of cylinders of the internal combustion engine according to the rotation of a camshaft of the internal combustion engine;

crank angle position signal generation means including a member rotating through two revolutions when the camshaft rotates through one revolution, said crank angle position signal generation means for generating a crank angle position signal including pulse dropout portions corresponding to each of the cylinders of the internal combustion engine in accordance with the rotation angle of a crankshaft of the internal combustion engine; and a control unit for unit detecting the crank angle position signal to obtain the number of detections of the crank angle position signal; detecting a reference crank position on the basis of one of the pulse dropout portions of the crank angle position signal; detecting the cylinder discrimination signal to obtain the number of detections of the cylinder discrimination signal; obtaining the number of detections of the crank angle position signal when the cylinder discrimination signal is detected; obtaining the number of pulse dropouts on the basis of one of the pulse dropout portions of the crank angle position signal; setting a temporary cylinder discrimination period with reference to the reference crank position; obtaining the number of detections of the cylinder discrimination signal in the temporary cylinder discrimination period on the basis of the number of detections of the cylinder discrimination signal and the number of detections of the crank angle position signal at the time of detection of the cylinder discrimination signal; setting the present crank position as a selected reference crank position when the cylinder discrimination signal is detected in the temporary cylinder discrimination period; setting a cylinder discrimination period with reference to the selected reference crank position; obtaining the number of detections of the cylinder discrimination signal in the cylinder discrimination period on the basis of the number of detections of the cylinder discrimination signal and the number of detections of the crank angle position signal at the time of detection of the cylinder discrimination signal; and identifying one of the cylinders on the basis of the number of pulse dropouts and the number of detections of the cylinder discrimination signal in the cylinder discrimination period.

10. A cylinder identifying apparatus for an internal combustion engine according to claim 9, wherein if the present reference crank position is provided with an angle for enabling setting of a temporary cylinder discrimination period after startup on the basis of the sum of the number detections of the crank angle position signal and the number of pulse dropouts, said control unit sets the temporary cylinder discrimination period.

11. A cylinder identifying apparatus for an internal combustion engine according to claim 10, wherein said control unit sets the temporary cylinder discrimination period in the vicinity of an engine stop position on the retardation side.

12. A cylinder identifying apparatus for an internal combustion engine according to claim 11, wherein the internal combustion engine is a 3-cylinder engine having a variable valve timing mechanism; the temporary cylinder discrimination period corresponds to an angle of 120 degrees; and the cylinder discrimination period corresponds to an angle of about 120 degrees from an angle of about 75 degrees before the compression top dead center of one of the cylinders to an angle of about 45 degrees before the compression top dead center of the next cylinder.

* * * * *